US 7,418,583 B2

United States Patent
Shibayama et al.

(10) Patent No.: US 7,418,583 B2
(45) Date of Patent: Aug. 26, 2008

(54) DATA DEPENDENCY DETECTION USING HISTORY TABLE OF ENTRY NUMBER HASHED FROM MEMORY ADDRESS

(75) Inventors: Atsufumi Shibayama, Tokyo (JP); Satoshi Matsushita, Tokyo (JP); Sunao Torii, Tokyo (JP); Naoki Nishi, Tokyo (JP)

(73) Assignee: NEC Corporation, Tokyo (JP)

( * ) Notice: Subject to any disclaimer, the term of this patent is extended or adjusted under 35 U.S.C. 154(b) by 78 days.

(21) Appl. No.: 11/126,310

(22) Filed: May 11, 2005

(65) Prior Publication Data
US 2005/0216705 A1   Sep. 29, 2005

Related U.S. Application Data

(62) Division of application No. 09/994,806, filed on Nov. 28, 2001, now Pat. No. 6,931,514.

(30) Foreign Application Priority Data
Nov. 29, 2000  (JP)  .............................. 2000-363727

(51) Int. Cl.
*G06F 9/34* (2006.01)
(52) U.S. Cl. ..................... 712/228; 712/225; 712/240; 712/248; 711/128; 711/3
(58) Field of Classification Search ................ 718/104; 712/23, 122, 143, 167, 217, 218; 711/122, 711/143, 167, 217
See application file for complete search history.

(56) References Cited

U.S. PATENT DOCUMENTS 5,471,598 A * 11/1995 Quattromani et al. ....... 711/122

(Continued)

FOREIGN PATENT DOCUMENTS

JP  5-224927  9/1993

(Continued)

OTHER PUBLICATIONS

Koike, H., et al., "Design of Automatic Parallelizing Intermediate Code Interpreter", vol. 40, No. SIG10 (PRO 5), pp. 64-74 (1999).

(Continued)

*Primary Examiner*—Henry W. H. Tsai
*Assistant Examiner*—Cheng-Yuan Tseng
(74) *Attorney, Agent, or Firm*—Foley & Lardner LLP

(57) ABSTRACT

A detector detects at least one kind of dependence in address between instructions executed by at least a processor, the detector being adopted to detect a possibility of presence of the at least one kind of dependence, wherein if the at least one kind of dependence is present in fact, then the detector detects a possibility of presence of the at least one kind of dependence, and if the at least one kind of dependence is not present in fact, then the detector may detect a pseudo presence of the at least one kind of dependence. The detector has an execution history storing unit with a plurality of entries and an address converter for converting an address of a memory access instruction into an entry number, where different addresses may be converted into entry numbers that are the same.

22 Claims, 12 Drawing Sheets

U.S. PATENT DOCUMENTS

| | | | |
|---|---|---|---|
| 5,522,052 A | 5/1996 | Inoue et al. | |
| 5,625,835 A | 4/1997 | Ebcioglu et al. | |
| 5,694,577 A | 12/1997 | Kiyohara et al. | |
| 5,754,819 A * | 5/1998 | Lynch et al. | 711/218 |
| 5,781,752 A | 7/1998 | Moshovos et al. | |
| 5,838,988 A * | 11/1998 | Panwar et al. | 712/32 |
| 5,848,256 A | 12/1998 | Call et al. | |
| 5,872,949 A | 2/1999 | Kikuta et al. | |
| 5,897,666 A | 4/1999 | Mallick et al. | |
| 5,903,751 A * | 5/1999 | Hoyt et al. | 712/238 |
| 5,913,049 A | 6/1999 | Shiell et al. | |
| 5,913,059 A * | 6/1999 | Torii | 718/104 |
| 5,944,817 A * | 8/1999 | Hoyt et al. | 712/240 |
| 6,009,269 A | 12/1999 | Burrows et al. | |
| 6,065,105 A | 5/2000 | Zaidi et al. | |
| 6,272,614 B1 * | 8/2001 | Calamvokis et al. | 711/216 |
| 6,345,351 B1 * | 2/2002 | Holmberg | 711/203 |
| 6,389,446 B1 * | 5/2002 | Torii | 718/100 |
| 6,438,671 B1 * | 8/2002 | Doing et al. | 711/173 |
| 6,625,725 B1 * | 9/2003 | Wu et al. | 712/245 |
| 6,658,554 B1 | 12/2003 | Moshovos et al. | |
| 6,658,559 B1 | 12/2003 | Arora et al. | |
| 6,665,708 B1 * | 12/2003 | Tikekar et al. | 709/215 |
| 6,877,088 B2 * | 4/2005 | Dice | 712/235 |
| 6,931,514 B2 * | 8/2005 | Shibayama et al. | 712/216 |
| 6,970,997 B2 * | 11/2005 | Shibayama et al. | 712/225 |
| 2002/0066005 A1 * | 5/2002 | Shibayama et al. | 712/218 |
| 2002/0178349 A1 * | 11/2002 | Shibayama et al. | 712/235 |

FOREIGN PATENT DOCUMENTS

| | | |
|---|---|---|
| JP | 7-56735 | 3/1995 |
| JP | 8-314721 | 11/1996 |
| JP | 9-185507 A | 7/1997 |
| JP | 10-254716 | 9/1998 |
| JP | 11-212788 | 8/1999 |
| JP | 2000-47887 | 2/2000 |
| WO | WO 93/20505 A2 | 10/1993 |

OTHER PUBLICATIONS

Franklin et al., "ARB: A Hardware Mechanism for Dynamic Reordering of Memory References"—IEEE Transactions on Computers, vol. 45, No. 5, May 1996, pp. 552-571.

Pai, V.S., "Processor Memory Unit," http://www-ece.rice.edu/~rsim/Manual/node25.html, (Aug. 7, 1997), pp. 1-4.

* cited by examiner data dependence detected result

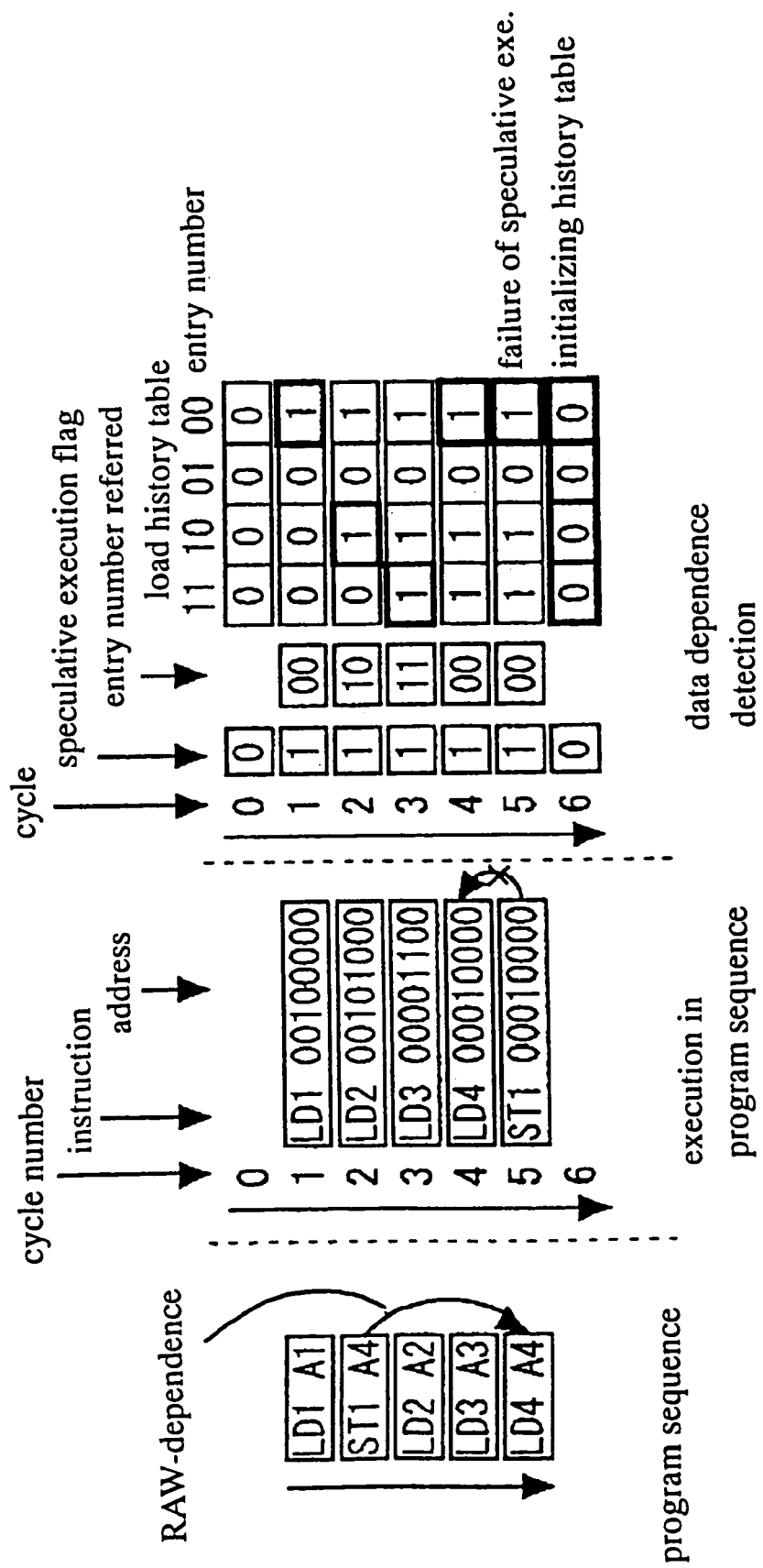

DATA DEPENDENCY DETECTION USING HISTORY TABLE OF ENTRY NUMBER HASHED FROM MEMORY ADDRESS

This application is a divisional of U.S. Ser. No. 09/994,806, filed Nov. 28, 2001, which claims priority from Japanese patent application JP 2000-363727, filed Nov. 29, 2000. The entire contents of each of the aforementioned applications are incorporated herein by reference.

BACKGROUND OF THE INVENTION

1. Field of the Invention

The present invention relates to a data processor, and more particularly to a data processor with an improved data dependence detector.

2. Description of the Related Art

A non-program sequence execution or an out-of-order execution has widely been used for improving a high speed processing, wherein the instructions arc executed in a different sequence or order from a definitive sequence or order defined by a program. In accordance with the non-program sequence execution or the out-of-order execution, the processor executes an instruction which has become executable prior to an instruction which has not been non-executable yet, even if the non-executable instruction is prior in program sequence to the executable instruction, thereby improving the performance of the processor as compared to when the processor executes instructions in accordance with program sequences defined by the program or in-order execution.

The condition for allowing the non-program sequence execution is that no read after write dependence between instructions with reference to a registers The read after write dependence may also be referred to as a flow dependence.

If a post instruction, which is post in program sequence to a prior instruction, refers a register which is converted by the prior instruction, this means that a read after write dependence from the prior instruction to the post instruction is present. If the processor executes the post instruction and then the prior instruction in violation to the read after write dependence, then the meaning of the program is changed and it is no longer possible to obtain the correct execution result. Namely, if the read after write dependence is present to the register, then this means it impossible to execute the instructions in the non-program sequence.

If a prior instruction, which is prior in program sequence to a post instruction, refers a register which is converted by the post instruction, this means that a write after read dependence from the prior instruction to the post instruction is present. The write after read dependence may also referred to as an anti-dependence. If the processor executes the post instruction and then the prior instruction in violation to the write after read dependence, then the meaning of the program is changed and it is no longer possible to obtain the correct execution result. Namely, if the write after read dependence is present to the register, then this means it impossible lo execute the instructions in the non-program sequence.

If a post instruction, which is post in program sequence to a prior instruction, changes a register which is converted by the prior instruction, this means that a write after write dependence from the prior instruction to the post instruction is present. The write after write dependence is an output dependence. If the processor executes the post instruction and then the prior instruction in violation to the write after write dependence, then the meaning of the program is chanced and it is no longer possible to obtain the correct execution result. Namely, if the write after write dependence is present to the register, then this means it impossible to execute the instructions in the non-program sequence.

When the instruction is decoded, the register referred or changed by the instruction is confirmed, the instructions having the read after write dependence are likely to be executed by the program sequence.

It has been know to cancel the write after read dependence and the write after write dependence for allowing the non-program sequence execution.

Instructions which have accesses to a memory are dependent not only on the dependence on the register but also on the dependence on the memory.

Usually, the memory access instructions include a load instruction for reading out data from the memory and a store instruction for writing data into the memory.

If two load instructions or two store instructions have different addresses from each other, no dependence is present to the memory. This allows such the instructions to be executed by the non-program sequence.

If two load instructions or two store instructions have the same address as each other, a dependence is present to the memory. If, for example, a load instruction reads out data from an address, to which the data are stored by a store instruction which is prior in program sequence to the load instruction, then this means that a read after write dependence from the store instruction to the load instruction is present. In this case, if the instructions are executed in a reverse sequence to the program sequence, then the program meaning is changed and it is no longer possible to obtain the correct result of the execution of the program. Namely, if the read after write dependence is present to the memory, it is impossible to execute the instructions in the non-program order.

If, for example, a store instruction stores data to an address, from which the data have been read out by a load instruction which is prior in program sequence to the store instruction, then this means that a write after read dependence from the load instruction to the store instruction is present. In this case, if the instructions are executed in a reverse sequence to the program sequence, then the program meaning is changed and it is no longer possible to obtain the correct result of the execution of the program. Namely, if the write after read dependence is present to the memory, it is impossible to execute the instructions in the non-program order.

If, for example, a store instruction stores data to an address, to which the data have been stored by a store instruction which is prior in program sequence to the store instruction, then this means that an write after write dependence from the prior store instruction to the post store instruction is present. In this case, if the instructions arc executed in a reverse sequence to the program sequence, then the program meaning is changed and it is no longer possible to obtain the correct result of the execution of the program. Namely, if the write after write dependence is present to the memory, it is impossible to execute the instructions in the non-program order.

It has been know to cancel the write after read dependence and the write after write dependence by temporary storing data, which are to be stored by the store instruction, into a store buffer for allowing the non-program sequence execution.

If the read after write dependence is present, it is necessary to execute the instructions in the program sequences. It is, however, likely that an address of the load/store instruction has been unknown until the instruction is about to be executed. Namely, it is likely that the dependence has been unknown until the execution of the instruction. For this reason, a disadvantage in performance of the processor by the inhibition to the non-program sequence execution is large.

FIG. 1A is a diagram illustrative of a program sequence of store/load instructions. The program sequence is, that a load instruction "LD1" at an address "A1", a store instruction "ST1" at an address "A4'", a load instruction "LD2" at an address "A2", a load instruction "LD3" at an address "A3", and a load instruction "LD4" at an address "A4".

Assuming that the address "A4'" of the store instruction "ST1" is equal to the address "A4" of the load instruction "LD4", then the store instruction "ST1" and the load instruction "LD4" access to the same address "A4", and the store instruction "ST1" is prior in program sequence to the load instruction "LD4". A read after write dependence from the store instruction "ST1" to the load instruction "LD4" is present.

The program expects that the store instruction "ST1" stores data at the address "A4" and then the load instruction "LD4" reads this data out from the address "A4", for which reason it is necessary that the store instruction "ST1" is executed prior to the execution of the load instruction "LD4" in accordance with the program sequence.

FIG. 1B is a diagram illustrative of executions of instructions in the program sequence of FIG. 1A. Cycle numbers, execution instructions, addresses of the execution instructions are shown. It is assumed that the address "A4'" of the store instruction "ST1" has not been known until the fifth cycle 5.

In the first cycle 1, the load instruction "LD1" at the address "A1" is executed. In the fifth cycle 5, the store instruction "ST1" at the address "A4'" is executed. In the sixth cycle 6, the load instruction "LD2" at the address "A2" is executed. In the seventh cycle 7, the load instruction "LD3" at the address "A3" is executed. In the eighth cycle 8, the load instruction "LD4" at the address "A4" is executed.

Even if the addresses "A2", "A3", and "A4" become known in the second, third and fourth cycles 2, 3 and 4 respectively, then it is inhibited that the load instructions "LD2", "LD3", and "LD4" are executed in the second, third and fourth cycles 2, 3 and 4 respectively which are prior to the store instruction "ST1" in the fifth cycle 5 because the address "A4'" of the store instruction "ST1" has not been known until the fifth cycle 5, and thus the read after write dependence from the store instruction "ST1" to respective one of the load instructions "LD2", "LD3" and "ID4" has not been known until the fifth cycle 5.

In accordance with the conventional program sequence execution, the load/store instructions are inhibited to be executed in the -second, third and fourth cycles 2, 3 and 4. The eight cycles are necessary to execute the five load/store instructions. The program sequence execution may drop the effective performance of the processor.

The speculative execution in accordance with the non-program sequence, assuming that the read after write dependence is not present, has been known as prior art. The speculative execution of instructions to the dependence between data will hereinafter be referred to as "data dependence speculative execution".

In accordance with the data dependence speculative execution, it is possible in one case that the read after write dependence is actually not present and the speculative execution results in the success. It is also in another case that the read after write dependence is actually present and the speculative execution results in the failure. At the time when the read after write dependence becomes known, it is necessary to judge whether this case is either of the above two cases.

If the read after write dependence is actually not present and the speculative execution results in the success, the continuation to execute the subsequent instructions is allowed, whereby the effective performance of the processor is improved by the data dependence speculative execution in accordance with the non-program sequence.

If, however, the read after write dependence is actually present and the speculative execution results in the failure, then the program meaning is changed, thus it is no longer possible to ensure the correct result of the execution of the program. For this reason, the result obtained by the data dependence speculative execution in the non-program sequence is canceled, and in place the recovery process for the failure of the data dependence speculative execution is necessary. The recovery process for the failure of the data dependence speculative execution might be likely to drop the performance of the processor in comparison with the execution in the program sequence. If, however, a probability of success in the data dependence speculative execution is sufficiently higher than a probability of failure in the data dependence speculative execution, then the effective performance of the processor for processing the program may be improved in total.

The non-program sequence execution is disclosed by Mike Johnson in "Super-scalar processor" 1994. The recovery process for the failure in the data dependence speculative execution is disclosed in Japanese laid-open patent publication No. 5-224927.

FIG. 1C is a diagram illustrative of one example of the data dependence speculative execution which has resulted in the success. Cycle numbers, execution instructions, addresses of the execution instructions are shown. It is assumed that the address "A4'" of the store instruction "ST1" has not been known until the fifth cycle 5. It is also assumed that the address "A2" of the load instruction "LD2" has been known in the second cycle 2, the address "A3" of the load instruction "LD3" has been known in the third cycle 3, and the address "A4" of the load instruction "LD4" has been known in the sixth cycle 6.

In the first cycle 1, the load instruction "LD1" at the address "A1" is executed. In the second cycle 2, the load instruction "LD2" at the address "A2" is executed in non-program sequence because the address "A2" of the load instruction "LD2" has been known in the second cycle 2, whilst the address "A4'" of the store instruction "ST1" has not been known in the second cycle 2. In the second cycle 2, the read after write dependence from the store instruction "ST1" to the load instruction "LD2" has not been known. The load instruction "LD2" is executed speculatively to the store instruction "ST1".

In the third cycle 3, the load instruction "LD3" at the address "A3" is executed in non-program sequence because the address "A3" of the load instruction "LD3" has been known in the third cycle 3, whilst the address "A4'" of the store instruction "ST1" has not been known in the third cycle 3. In the third cycle 3, the read after write dependence from the store instruction "ST1" to the load instruction "LD3" has not been known. The load instruction "LD3" is executed speculatively to the store instruction "ST1".

In the forth cycle 4, the address. "A4'" of the store instruction "ST1" and the address "A4" of the load instruction "LD4" have not been known. Either the store instruction "ST1" and the load instruction "LD4" have been executed.

In the fifth cycle 5, the address "A4'" of the store instruction "ST1" has become known, and the store instruction "ST1" is executed. Concurrently, the read after write dependence from the store instruction "ST1" to respective one of the load instruction "LD2" and the load instruction "LD3" is judged. In this case, the address "A2" of the load instruction "LD2" and the address "A3" of the load instruction "LD3" are different from the address "A4'" of the store instruction "ST1", then the read after write dependence is not present.

It is, therefore, judged that the data dependence speculative executions of the load instruction "LD2" and the load instruction "LD3" result in success. The subsequent instruction is continuously executed. In the sixth cycle 6, the load instruction "LD4" is executed in the program sequence with reference to the store instruction "ST1", for which reason no program is raised even the read after write dependence is present from the store instruction "ST1" to the load instruction "LD4".

The program sequence execution shown in FIG. 1B needs the eight cycles. By contrast, the succeeded data dependence speculative execution in the non-program sequence shown in FIG. 1C needs the six cycles. The data dependence speculative execution in the non-program sequence improves the performance by two cycle, provided that the data dependence speculative execution is succeeded.

FIG. 1D is a diagram illustrative of one example of the data dependence speculative execution which has resulted in the failure. Cycle numbers, execution instructions, addresses of the execution instructions are shown. It is assumed that the address "A4'" of the store instruction "ST1" has not been known until the fifth cycle 5. It is also assumed that the address "A2" of the load instruction "LD2" has been known in the second cycle 2, the address "A3" of the load instruction "LD3" has been known in the third cycle 3, and the address "A4" of the load instruction "LD4" has been known in the fourth cycle 4.

In the first cycle 1, the load instruction "LD1" at the address "A1" is executed. In the second cycle 2, the load instruction "LD2" at the address "A2" is executed in non-program sequence because the address "A2" of the load instruction "LD2" has been known in the second cycle 2, whilst the address "A4'" of the store instruction "ST1" has not been known in the second cycle 2. In the second cycle 2, the read after write dependence from the store instruction "ST1" to the load instruction "LD2" has not been known. The load instruction "LD2" is executed speculatively to the store instruction "ST1".

In the third cycle 3, the load instruction "LD3" at the address "A3" is executed in non-program sequence because the address "A3" of the load instruction "LD3" has been known in the third cycle 3, whilst the address "A4'" of the store instruction "ST1" has not been known in the third cycle 3. In the third cycle 3, the read after write dependence from the store instruction "ST1" to the load instruction "LD3" has not been known. The load instruction "LD3" is executed speculatively to the store instruction "ST1".

In the forth cycle 4, the address "A4'" of the store instruction "ST1" has not been known, whilst the address "A4" the load instruction "LD4" have become known. The load instruction "LD4" is executed.

In the fifth cycle 5, the address "A4'" of the store instruction "ST1" has become known, and the store instruction "ST1" is executed. Concurrently, the read after write dependence from the store instruction "ST1" to respective one of the load instruction "LD2", the load instruction "LD3" and the load instruction "LD4" is judged. In this case, the address "A2" of the load instruction "LD2" and the address "A3" of the load instruction "LD3" are different from the address "A4'" of the store instruction "ST1", the n the read after write dependence is not present.

Since, however, the address "A4" of the load instruction "LD4" is the same as the address "A4'" of the store instruction "ST1", the read after write dependence from the store instruction "ST1" to the load instruction "LD4" is present. Even the read after write dependence from the store instruction "ST1" to the load instruction "LD4" is present, the non-program execution has been accomplished, for which reason the data dependence speculative execution of the load instruction "LD4" is judged to be the failure.

In order to ensure the correct result of the execution of the program, it is necessary to perform the recovery process for the failure of the data dependence speculative execution.

In the fifth cycle 5, the failure of the data dependence speculative execution is judged. The execution results of the load instruction "LD2" in the second cycle 2, the load instruction "LD3" in the third cycle 3, the load instruction "LD4" in the fourth cycle 4, the store instruction "ST1" in the fifth cycle 5 are canceled. Re-executions of the store instruction "ST1" in the seventh cycle 7, the load instruction "LD2" in the eighth cycle 8, the load instruction "LD3" in the ninth cycle 9, the load instruction "LD4" in the tenth cycle 10 are made as the recovery processes for the failure of the data dependence speculative execution.

The executions of the five instructions, for example, the store instruction "ST1", the load instruction "LD2", the load instruction "LD3" and the load instruction "LD4" need ten cycles. The program sequence execution shown in FIG. 1B needs the eight cycles. By contrast, the failure data dependence speculative execution in the non-program sequence shown in FIG. 1D needs the ten cycles. The data dependence speculative execution in the non-program sequence deteriorates the performance by two cycle, provided that the data dependence speculative execution is failure.

If, however, a probability of success in the data dependence speculative execution is sufficiently higher than a probability of failure in the data dependence speculative execution, then the effective performance of the processor for processing the program may be improved in total.

For allowing the processor to perform the data dependence speculative execution, it is necessary to judge the presence of the read after write dependence between the load/store instructions with reference to the memory. A data dependence detector has been known as detecting the presence of the read after write dependence between the load/store instructions. The conventional data dependence detector is disclosed by Manoj Franklin et al, entitled "ARB: A Hardware Mechanism For Dynamic Reordering Of Memory References", IEEE Transactions On Computers, vol. 45, No. 5, May, 1996.

FIG. 2 is a diagram illustrative of a conventional data dependence detector. The conventional data dependence detector 100 includes address buffers 101, address comparators 102, and a logic-OR circuit 103. The address buffers 101 store plural load addresses of the load instructions. The address comparators 102 are connected to the address buffers 101 for comparing the plural load addresses of the load instructions stored in the address buffers 101 and a store address of the store instruction which have just been executed. The logic-OR circuit 103 takes a logical-OR of all of the compared results from the address comparators 102 and outputs a data dependence detected result.

The detection of the read after write dependence from the store instruction to the load instruction is realized by the following operations of the data dependence detector 100. If the load instruction is executed by the data dependence speculative execution, the address of the load instruction is stored into a free address buffer 101. Subsequently, a store instruction is executed. The address of the store instruction is inputted into all of the plural address comparators 102, so that the plural address comparators 102 compare the load addresses of the executed load addresses with the inputted store address of the store instruction just executed and outputs the compared results which are transmitted to the logic-OR circuit 103.

The logic-OR circuit 103 takes the logical-OR of all of the compared results from the plural address comparators 102, and outputs the data dependence detected result. If the store address of the store instruction does not correspond to any of the load addresses of the load instructions stored in the address buffers 101, then it is judged that the read after write dependence from the store instruction to respective one of the load instructions is not present. The data dependence detected result indicates that the read after write dependence from the store instruction to respective one of the load instructions is not present. This means that the data dependence speculative execution has resulted in the success. Subsequent instructions will continuously be executed.

If the store address of the store instruction does correspond to any one of the load addresses of the load instructions stored in the address buffers 101, then it is judged that the read after write dependence from the store instruction to respective one of the load instructions is present. The data dependence detected result indicates that the read after write dependence from the store instruction to respective one of the load instructions is present. This means that the data dependence speculative execution has resulted in the failure. The recovery process for the failure of the data dependence speculative execution will subsequently be accomplished.

The above conventional data dependence detector 100 has the following two problems.

The first problem is that the necessary hardware size is large because for ensuring the exactly correct execution result of the program in the data dependence speculative execution, it is necessary to detect in full all of the read after write dependence.

The conventional data dependence detector 100 stores the load addresses of all the load instructions executed by the data dependence speculative execution into the address buffers 101 and then the address comparators 102 compare the load addresses with the store address of the store instruction. The load addresses of the load instructions executed by the data dependence speculative execution are stored into the address buffers 101. If no free space is present in the address buffers 101, then it is no longer possible to subject the load instructions to the data dependence speculative execution.

In this case, the subsequent load/store instructions are executed in the program sequence. The number of the load instructions which may be executed by the data dependence speculative execution is limited by both the number of the address buffers 101 and the number of the address comparators 102. In order to improve the performance of the data dependence speculative execution, a large number of the address buffers 101 and a large number of the address comparators 102 are needed, whereby the necessary hardware size is large.

A second problem is that the speed of detecting the read after write dependence is slow. In order to detect the read after write dependence, it is necessary to take not only a time for processing the address comparison by the address comparator 102 but also a time for logic operation of the outputs from the address comparators 102. This makes it possible to improve the high frequency performance of the processor.

As the number of the address buffers 101 and the number of the address comparators 102 are increased, the number of the inputs into the logic-OR circuit 103 is also increased, whereby the above disadvantages become more remarkable.

Accordingly, the conventional data dependence detector needs a large hardware size for improving the performance of the data dependence speculative execution. The large hardware size increases the necessary time for processing the detection of the read after write dependence, thereby making it difficult to improve the high speed performance of the processor.

In the above circumstances, the development of a novel data dependence detector free from the above problems is desirable.

SUMMARY OF THE INVENTION

Accordingly, it is an object of the present invention to provide a novel data dependence detector free from the above problems.

It is a further object of the present invention to provide a novel data dependence detector with a small hardware size which is, however, capable of the data dependence speculative execution for obtaining a substantive improvement in effective performance of the processor, whereby the number of the load instructions which may be executed by the data dependence speculative execution is not limited by the hardware size of the data dependence detector.

It is a still further object of the present invention to provide a novel processor including a data dependence detector free from the above problems.

It is yet a further object of the present invention to provide a novel processor including a data dependence detector with a small hardware size which is, however, capable of the data dependence speculative execution for obtaining a substantive improvement in effective performance of the processor, whereby the number of the load instructions which may be executed by the data dependence speculative execution is not limited by the hardware size of the data dependence detector.

It is a still further object of the present invention to provide a novel multi-processor system including a plurality of processors, each of which includes a data dependence detector free from the above problems.

It is yet a further object of the present invention to provide a novel multi-processor system including a plurality of processors, each of which includes a data dependence detector with a small hardware size which is, however, capable of the data dependence speculative execution for obtaining a substantive improvement in effective performance of the processor, whereby the number of the load instructions which may be executed by the data dependence speculative execution is not limited by the hardware size of the data dependence detector.

The present invention provides a detector for detecting at least one kind of dependence in address between instructions executed by at least a processor, the detector being adopted to detect a possibility of presence of the at least one kind of dependence, wherein if the at least one kind of dependence is present in fact, then the detector detects a possibility of presence of the at least one kind of dependence, and if the at least one kind of dependence is not present in fact, then the detector is allowed to detect the at least one kind of dependence.

The present invention also provides a detector provided in a self-processor included in a multiple processor system including the self-processor and at least a processor other than the self-processor, and the multiple processor system performing parallel processings in thread units of program, and the detector detecting at least one kind of dependence in address between an instruction included in a thread executed by the self-processor and an instruction included in a thread executed by the other processor, the detector being adopted to detect a possibility of presence of the at least one kind of dependence, wherein if the at least one kind of dependence is present in fact, then the detector detects a possibility of presence of the at least one kind of dependence, and if the at least one kind of dependence is not present in fact, then the detector is allowed to detect the at least one kind of dependence.

The present invention also provides a detector provided in a self-processor included in a multiple processor system including the self-processor and at least a processor other than the self-processor, and the multiple processor system performing parallel processings in thread units of program, and the detector detecting at least one kind of dependence in address between an instruction included in a thread executed by the self-processor and an instruction included in a thread executed by the other processor, the detector being adopted to detect a possibility of presence of the at least one kind of dependence, as well as the detector detecting at least one kind of dependence in address between instructions included in a thread executed by the self-processor, wherein if the at least one kind of dependence is present in fact, then the detector detects a possibility of presence of the at least one kind of dependence, and if the at least one kind of dependence is not present in fact, then the detector is allowed to detect the at least one kind of dependence.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

FIG. 6A is a diagram illustrative of the instruction program sequence involved in operations of the data dependence detector.

FIG. 6B is a diagram illustrative of the instruction execution Sequence involved in operations of the data dependence detector.

FIG. 6C is a diagram illustrative of the data dependence detective unit involved in operations of the data dependence detector with reference to the instruction execution sequence.

DETAILED DESCRIPTION OF THE PREFERRED EMBODIMENTS

Figure 1:
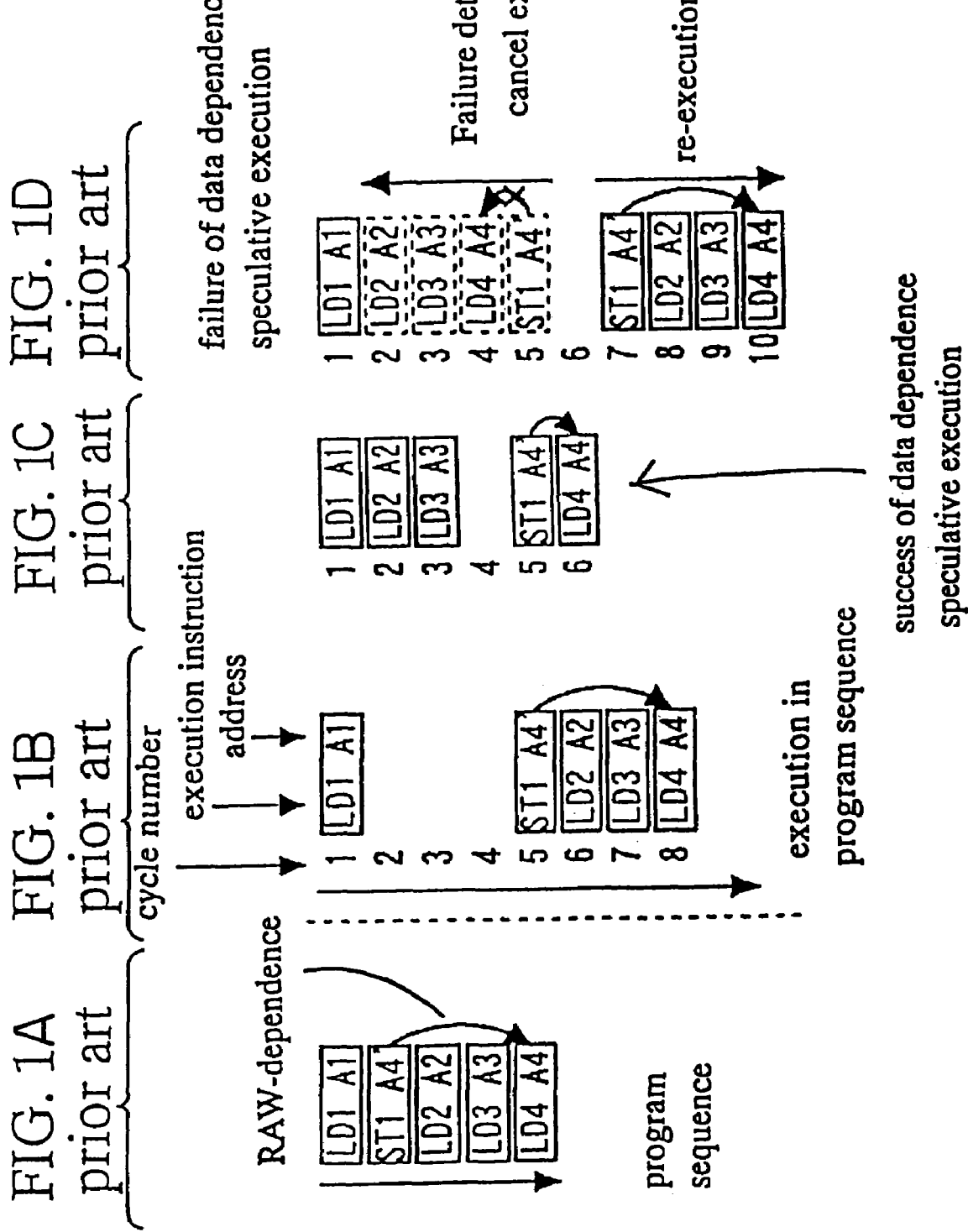
FIG. 1A is a diagram illustrative of a program sequence of store/load instructions.
FIG. 1B is a diagram illustrative of executions of instructions in the program sequence of FIG. 1A.
FIG. 1C is a diagram illustrative of one example of the data dependence speculative execution which has resulted in the success.
FIG. 1D is a diagram illustrative of one example of the data dependence speculative execution which has resulted in the failure.
Figure 2:
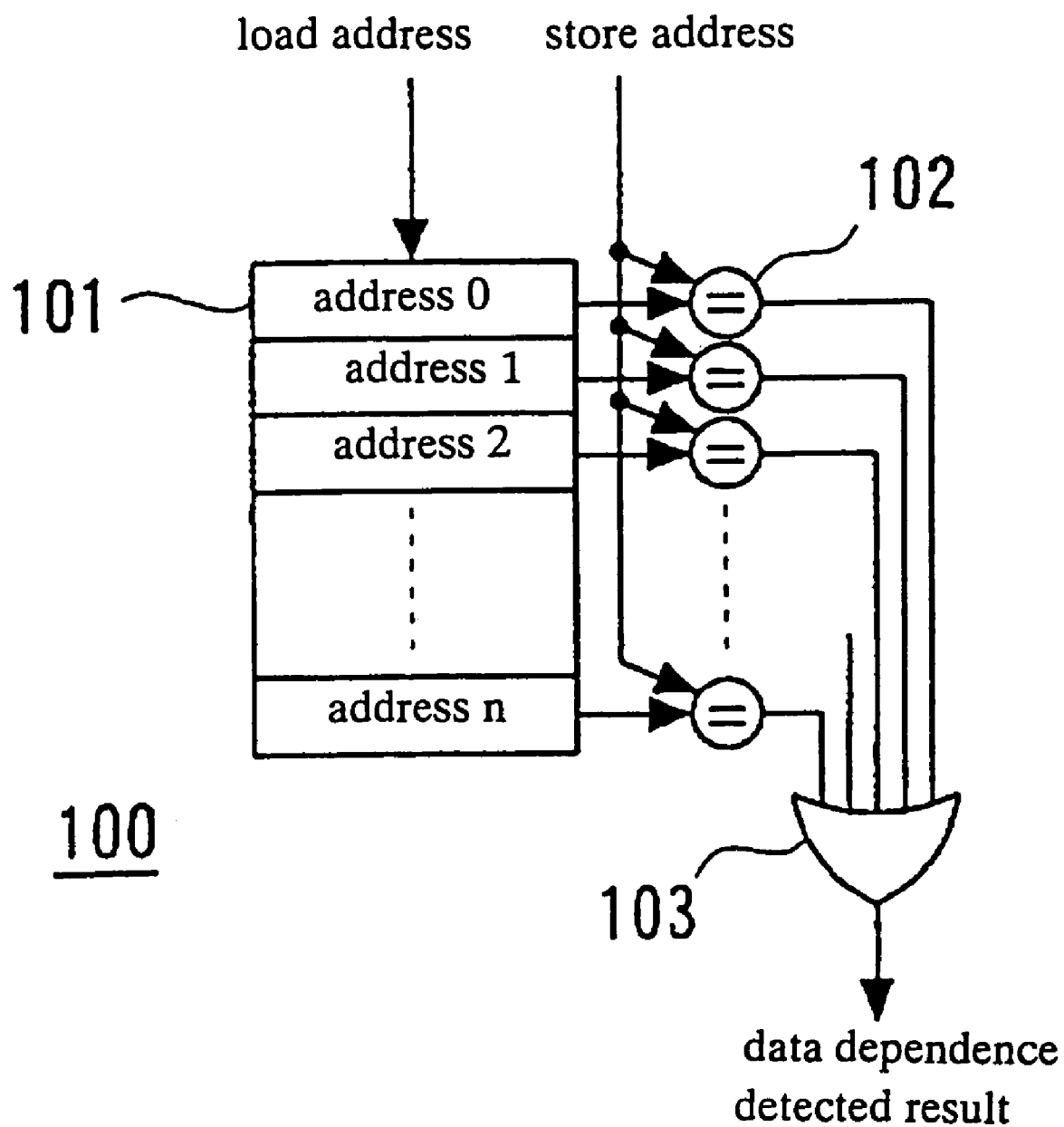
FIG. 2 is a diagram illustrative of a conventional data dependence detector.

A first aspect of the present invention is a detector for detecting at least one kind of dependence in address between instructions executed by at least a processor, the detector being adopted to detect a possibility of presence of the at least one kind of dependence, wherein if the at least one kind of dependence is present in fact, then the detector detects a possibility of presence of the at least one kind of dependence, and if the at least one kind of dependence is not present in fact, then the detector is allowed to detect the at least one kind of dependence.

It is possible that the instruction comprises a memory access instruction for access to a memory.

It is possible that the detector includes an, execution history storing unit including a plurality of entry which stores an instruction execution information of whether the memory access instruction has been executed; and an address converter for converting an address of the memory access instruction into an entry number of the entry of the execution history storing unit, so that the execution history storing unit stores the instruction execution information into the entry designated by the entry number.

It is possible that the address converter is adopted to convert a same address of different memory access instructions into a same entry number for allowing that the same address for the different memory access instructions is stored in the same entry, whereby if the at least one kind of dependence is not present in fact, then the detector is adopted to detect the at least one kind of dependence.

It is possible that the memory access instruction comprises either a load instruction or a store instruction.

It is possible that the one kind of the dependence is a read after write dependence, and if the load instruction has been executed, then the address converter is adopted to convert an address of the load instruction into an entry number, and the detector stores an instruction execution information, that the load instruction has been executed, into the entry designated by the entry number of the execution history storing unit, and if the store instruction has been executed, then the address converter is adopted to convert an address of the store instruction into an entry number, and the detector reads an instruction execution information, whether or not the load instruction has been executed, out from the entry designated by the entry number of the execution history storing unit, whereby the detector detects a possibility of presence of the read after write dependence from the store instruction as executed into the load instruction as executed.

It is possible that the one kind of the dependence is a write after read dependence, and if the store instruction has been executed, then the address converter is adopted to convert an address of the store instruction into an entry number, and the detector stores an instruction execution information, that the store instruction has been executed, into the entry designated by the entry number of the execution history storing unit, and if the load instruction has been executed, then the address converter is adopted to convert an address of the load instruction into an entry number, and the detector reads an instruction execution information, whether or not the store instruction has been executed, out from the entry designated by the entry number of the execution history storing unit, whereby the detector detects a possibility of presence of the write after read dependence from the load instruction as executed into the store instruction as executed.

It is possible that the one kind of the dependence is an write after write dependence, and if the store instruction has been executed, then the address converter is adopted to convert an address of the store instruction into an entry number, and the detector reads an instruction execution information, whether or not the store instruction has been executed, out from the entry designated by the entry number of the execution history storing unit, and also the detector stores an instruction execution information, that the store instruction has been executed, into the entry designated by the entry number of the execution history storing unit, whereby the detector detects a possibility of presence of the write after write dependence between the store instructions as executed.

It is possible that the one kind of the dependence is a read after write dependence, a write after read dependence and an write after write dependence and if the load instruction has been executed, then the address converter is adopted to convert an address of the load instruction into an entry number, and the detector reads an instruction execution information, whether or not the store instruction has been executed, from the entry designated by the entry number of the execution history storing unit, and also the detector stores an instruction execution information, that the load instruction has been executed, into the entry designated by the entry number of the execution history storing unit, and if the store instruction has been executed, then the address converter is adopted to convert an address of the store instruction into an entry number, and the detector reads instruction execution informations, whether or not the load instruction has been executed and whether or not the store instruction has been executed, out from the entry designated by the entry number of the execution history storing unit, and also the detector stores an instruction execution information, that the store instruction has been executed into the entry designated by the entry number of the execution history storing unit, whereby the detector detects a possibility of presence of the read after write dependence from the store instruction as executed into the load instruction as executed, and also detects a possibility of presence of the write after read dependence from the load instruction as executed into the store instruction as executed as well as detects a possibility of presence of the write after write dependence between the store instructions as executed.

It is possible that the address converter is adopted to select plural bits of the address inputted and output the plural bits as indicating the entry number.

It is possible that the address converter is adopted to take an exclusive-OR of the selected plural bits and output a value of the exclusive-OR as indicating the entry member.

A second aspect of the present invention is a detector provided in a self-processor included in a multiple processor system including the self-processor and at least a processor other than the self-processor, and the multiple processor system performing parallel processings in thread units of program, and the detector detecting at least one kind of dependence in address between an instruction included in a thread executed by the self-processor and an instruction included in a thread executed by the other processor, the detector being adopted to detect a possibility of presence of the at least one kind of dependence, wherein if the at least one kind of dependence is present in fact, then the detector detects a possibility of presence of the at least one kind of dependence, and if the at least one kind of dependence is not present in fact, then the detector is allowed to detect the at least one kind of dependence.

It is possible that the instruction comprises a memory access instruction for access to a memory.

It is possible that the detector includes: an execution history storing unit including a plurality of entry which stores an instruction execution information of whether the memory access instruction has been executed; and an address converter for converting an address of the memory access instruction into an entry number of the entry of the execution history storing unit, so that the execution history storing unit stores the instruction execution information into the entry designated by the entry number.

It is possible that the address converter is adopted to convert a same address of different memory access instructions into a same entry number for allowing that the same address for the different memory access instructions is stored in the same entry, whereby if the at least one kind of dependence is not present in fact, then the detector is adopted to detect the at least one kind of dependence.

It is possible that only if the memory access instruction has been executed by other processor than the self-processor, and the other processor is to execute a thread which is prior in program sequence to the thread executed by the self-processor, then the address converter is adopted to convert an address of the memory access instruction into an entry number of the entry, and the detector reads an instruction execution information, whether or not the memory accesses instruction has been executed, from an entry designated by the entry number.

It is possible that if the memory access instruction has been executed by other processor than the self-processor, then the address converter is adopted to convert an address of the memory access instruction into an entry number of the entry, and the detector reads an instruction execution information, whether or not the memory accesses instruction has been executed, from an entry designated by the entry number by referring only a value which has been read out by the memory access instruction which had been executed by other processor executing a thread which is prior in program sequence to the thread executed by the self-processor.

It is possible that the memory access instruction comprises either a load instruction or a store instruction.

It is possible that the one kind of the dependence is a read after write dependence, and if the load instruction has been executed by the self-processor, then the address converter is adopted to convert an address of the load instruction into an entry number, and the detector stores an instruction execution information, that the load instruction has been executed by the self-processor, into the entry designated by the entry number of the execution history storing unit, and if the store instruction has been executed by the other processor, then the address converter is adopted to convert an address of the store instruction into an entry number, and the detector reads an instruction execution information, whether or not the load instruction has been executed by the self-processor, out from the entry designated by the entry number of the execution history storing unit, whereby the detector detects a possibility of presence of the read after write dependence from the store instruction as executed by the other processor into the load instruction as executed by the self-processor.

It is possible that the one kind of the dependence is a write after read dependence, and if the store instruction has been executed by the self-processor, then the address converter is adopted to convert an address of the store instruction into an entry number, and the detector stores an instruction execution information, that the store instruction has been executed by the self-processor, into the entry designated by the entry number of the execution history storing unit, and if the load instruction has been executed by the other processor, then the address converter is adopted to convert an address of the load instruction into an entry number, and the detector reads an instruction execution information, whether or not the store instruction has been executed by the self-processor, out from the entry designated by the entry number of the execution history storing unit, whereby the detector detects a possibility of presence of the write after read dependence from the load instruction as executed by the other processor into the store instruction as executed by the self-processor.

It is possible that the one kind of the dependence is an write after write dependence, and if the store instruction has been executed by the other processor, thou the address converter is adopted to convert an address of the store instruction into an entry number, and the detector reads an instruction execution information, whether or not the store instruction has been executed by the self-processor, out from the entry designated by the entry number of the execution history storing unit, if the store instruction has been executed by the self-processor, then the address converter is adopted to convert an address of the store instruction into an entry number, and the detector stores an instruction execution information, that the store instruction has been executed by the self-processor, into the entry designated by the entry number of the execution history storing unit, whereby the detector detects a possibility of presence of the write after write dependence from the store instruction as executed by the other processor to the store instruction as executed by the self-processor.

It is possible that the one kind of the dependence is a read after write dependence, a write after read dependence and an write after write dependence and if the load instruction has been executed by the other processor, then the address converter is adopted to convert an address of the load instruction into an entry number, and the detector reads an instruction execution information, whether or not the store instruction has been executed by the self-processor, from the entry designated by the entry number of the execution history storing unit, if the store instruction has been executed by the other processor, then the address converter is adopted to convert an address of the store instruction into an entry number, and the detector reads an instruction execution information, whether or not the load instruction has been executed by the self-processor, from the entry designated by the entry number of the execution history storing unit, if the load instruction has been executed by the self-processor, then the address converter is adopted to convert an address of the load instruction into an entry number, and the detector stores an instruction execution information, that the load instruction has been executed by the self-processor, into the entry designated by the entry number of the execution history storing unit, if the store instruction has been executed by the self-processor, then the address converter is adopted to convert an address of the store instruction into an entry number, and the detector stores an instruction execution information, that the store instruction has been executed by the self-processor, into the entry designated by the entry number of the execution history storing unit, whereby the detector detects a possibility of presence of the read after write dependence from the store instruction as executed by the other processor into the load instruction as executed by the self-processor, and also detects a possibility of presence of the write after read dependence from the load instruction as executed by the other processor into the store instruction as executed by the self-processor as well as detects a possibility of presence of the write after write dependence from the store instruction as executed by the other processor into the store instruction as executed by the self-processor.

It is possible that the address converter is adopted to select plural bits of the address inputted and output the plural bits as indicating the entry number.

It is possible that the address converter is adopted to take an exclusive-OR of the selected plural bits and output a value of the exclusive-OR as indicating the entry number.

A third aspect of the present invention is a detector provided in a self-processor included in a multiple processor system including the self-processor and at least a processor other than the self-processor, and the multiple processor system performing parallel processings in thread units of program, and the detector detecting at least one kind of dependence in address between an instruction included in a thread executed by the self-processor and an instruction included in a thread executed by the other processor, the detector being adopted to detect a possibility of presence of the at least one kind of dependence, as well as the detector detecting at least one kind of dependence in address between instructions included in a thread executed by the self-processor, wherein if the at least one kind of dependence is present in fact, then the detector detects a possibility of presence of the at least one kind of dependence, and if the at least one kind of dependence is not present in fact, then the detector is allowed to detect the at least one kind of dependence.

It is possible that the instruction comprises a memory access instruction for access to a memory.

It is possible that the detector includes an execution history storing unit including a plurality of entry which stores an instruction execution information of whether the memory access instruction has been executed; and an address converter for converting an address of the memory access instruction into an entry number of the entry of the execution history storing unit, so that the execution history storing unit stores the instruction execution information into the entry designated by the entry number.

It is possible that the address converter is adopted to convert a same address of different memory access instructions into a same entry number for allowing that the same address for the different memory access instructions is stored in the same entry, whereby if the at least one kind of dependence is not present in fact, then the detector is adopted to detect the at least one kind of dependence.

It is possible that only if the memory access instruction has been executed by other processor than the self-processor, and the other processor is to execute a thread which is prior in program sequence to the thread executed by the self-processor, then the address converter is adopted to convert an address of the memory access instruction into an entry number of the entry, and the detector reads an instruction execution information, whether or not the memory accesses instruction has been executed, from an entry designated by the entry number It is possible that if the memory access instruction has been executed by other processor than the self-processor, then the address converter is adopted to convert an address of the memory access instruction into an entry number of the entry, and the detector reads an instruction execution information, whether or not the memory accesses instruction has been executed, from an entry designated by the entry number by referring only a value which has been read out by the memory access instruction which had been executed by other processor executing a thread which is prior in program sequence to the thread executed by the self-processor.

It is possible that the memory access instruction comprises either a load instruction or a store instruction.

It is possible that the one kind of the dependence is a read after write dependence, and if the load instruction has been executed by the self-processor, then the address converter is adopted to convert an address of the load instruction into an entry number, and the detector stores an instruction execution information, that the load instruction has been executed by the self-processor, into the entry designated by the entry number of the execution history storing unit, and if the store instruction has been executed by either the self-processor or the other processor, then the address converter is adopted to convert an address of the store instruction into an entry number, and the detector reads an instruction execution information, whether or not the load instruction has been executed by the self-processor, out from the entry designated by the entry number of the execution history storing unit, whereby the detector detects a possibility of presence of the read after write dependence from the store instruction as executed by either the self-processor or the other processor into the load instruction as executed by the self-processor.

It is possible that the one kind of the dependence is a write after read dependence, and if the store instruction has been executed by the self-processor, then the address converter is adopted to convert an address of the store instruction into an entry number, and the detector stores an instruction execution information, that the store instruction has been executed by the self-processor, into the entry designated by the entry number of the execution history storing unit, and if the load instruction has been executed by either the self-processor or the other processor, then the address converter is adopted to convert an address of the load instruction into an entry number, and the detector reads an instruction execution information, whether or not the store instruction has been executed by the self-processor, out from the entry designated by the entry number of the execution history storing unit, whereby the detector detects a possibility of presence of the write after read dependence from the load instruction as executed by either the self-processor or the other processor into the store instruction as executed by the self-processor.

It is possible that the one kind of the dependence is an write after write dependence, and if the store instruction has been executed by the other processor, then the address converter is adopted to convert an address of the store instruction into an entry number, and the detector reads an instruction execution information, whether or not the store instruction has been executed by the self-processor, out from the entry designated by the entry number of the execution history storing unit, if the store instruction has been executed by the self-processor, then the address converter is adopted to convert an address of the store instruction into an entry number, and the detector reads an instruction execution information, whether or not the store instruction has been executed by the self-processor, out from the entry designated by the entry number of the execution history storing unit, as well as the detector stores an instruction execution information, that the store instruction has been executed by the self-processor, into the entry designated by the entry number of the execution history storing unit, whereby the detector detects a possibility of presence, of the write after write dependence from the store instruction as executed by either the self-processor or the other processor to the store instruction as executed by the self-processor.

It is possible that the one kind of the dependence is a read after write dependence, a write after read dependence and an write after write dependence and if the load instruction has been executed by either the self-processor or the other processor, then the address converter is adopted to convert an address of the load instruction into an entry number, and the detector reads an instruction execution information, whether or not the store instruction has been executed by the self-processor, from the entry designated by the entry number of the execution history storing unit, if the store instruction has been executed by either the self-processor or the other processor, then the address converter is adopted to convert an address of the store instruction into an entry number, and the detector reads an instruction execution information, whether or not the load instruction has been executed by the self-processor, from the entry designated by the entry number of the execution history storing unit, if the load instruction has been executed by the self-processor, then the address converter is adopted to convert an address of the load instruction into an entry number, and the detector stores an instruction execution information, that the load instruction has been executed by the self-processor, into the entry designated by the entry number of the execution history storing unit, if the store instruction has been executed by the self-processor, then the address converter is adopted to convert an address of the store instruction into an entry number, and the detector stores an instruction execution information, that the store instruction has been executed by the self-processor, into the entry designated by the entry number of the execution history storing unit, whereby the detector detects a possibility of presence of the read after write dependence from the store instruction as executed by either the self-processor or the other processor into the load instruction as executed by the self-processor, and also detects a possibility of presence of the write after read dependence from the load instruction as executed by either the self-processor or the other processor into the store instruction as executed by the self-processor as well as detects a possibility of presence of the write after write dependence from the store instruction as executed by either the self-processor or the other processor into the store instruction as executed by the self-processor.

It is possible that the address converter is adopted to select plural bits of the address inputted and output the plural bits as indicating the entry number.

It is possible that the address converter is adopted to take an exclusive-OR of the selected plural bits and output a value of the exclusive-OR as indicating the entry number.

A fourth aspect of the present invention is a processor including: an instruction execution unit; a processor control unit; and a data dependence detector, wherein for allowing the processor to execute the instructions, the processor control unit supplies a kind of the instruction to the instruction execution unit and the data dependence detector, and if the instruction to be executed is a memory access instruction which comprises either a load instruction for transferring data from a memory to a register or a store instruction for transferring data from the register to the memory, then the processor control unit supplies an address of the memory access instruction to the instruction execution unit and the data dependence detector as well as the processor control unit supplies the data dependence detector with a speculative execution flag which indicates that the memory access instruction is to be executed by a data dependence speculative execution, and the data dependence detector further includes: an execution history storing unit including a plurality of entry which stores an instruction execution information of whether the memory access instruction has been executed; and an address converter for converting an address of the memory access instruction into an entry number of the entry of the execution history storing unit, so that the execution history storing unit refers the speculative execution flag and an execution instruction from the processor control unit, and allows read/write operation of the instruction execution information to the entry designated by the entry number, and the data dependence detector supplies the processor control unit with a value which indicates whether the data dependence execution has been in success or failure.

It is possible that the address converter is adopted to convert a same address of different memory access instructions into a same entry number for allowing that the same address for the different memory access instructions is stored in the same entry, whereby if the at least one kind of dependence is not present in fact, then the detector is adopted to detect the at least one kind of dependence.

It is possible that the address converter is adopted to select plural bits of the address inputted and output the plural bits as indicating the entry number.

It is possible that the address converter is adopted to take an exclusive-OR of the selected plural bits and output a value of the exclusive-OR as indicating the entry number.

It is possible that in case that the processor is in a state of a speculative instruction execution to the data dependence, and if the processor has speculatively executed the load instruction, then the address converter converts the address of the load instruction into an entry number which is inputted into the instruction history storing unit, and the instruction history storing unit stores a value, which indicates that the load instruction has speculatively executed, into an entry designated by the entry number, and if the processor has speculatively executed the store instruction, then the address converter converts the address of the store instruction into an entry number which is inputted into the instruction history storing unit, and the instruction history storing unit reads a stored value out from an entry designated by the entry number, whereby the data dependence detector detects, based on the read out value, a possibility of presence of a read after write dependence from the store instruction from the load instruction, and if the possibility of presence of the read after write dependence is detected, the data dependence detector supplies the processor control unit with a value which indicates that the data dependence speculative execution has been in failure.

It is possible that the data dependence detector initializes all of the entries of the instruction history storing unit based on the speculative execution flag.

It is possible that if the data dependence detector supplies the processor control unit with a value which indicates that the data dependence speculative execution has been in failure, the processor control unit and the instruction execution unit perform a recovery process for failure of the data dependence speculative execution.

It is possible that if no presence of the read after write dependence from the store instruction to the load instruction is detected, then the data dependence detector supplies the processor control unit with a value which indicates that the data dependence speculative execution has been in success, the processor control unit continues subsequent instruction executions without execution of a recovery process.

A fifth aspect of the present invention is a multiple processor system for thread parallel processings, the system including: a plurality of processor which further includes an instruction execution unit; a processor control unit; and a data dependence detector; and a thread control unit being adopted to allocate threads to the plurality of processor for allowing each of the plurality of processor to execute at least an allocated thread, and the thread control unit being also adopted to supply each of the plurality of processor with both a respective speculative execution flag which indicate whether or not the thread should be executed by a data dependence speculative execution, and a thread sequence which indicates execution sequences of the threads, whereby each of the processors receives the speculative execution flag and the thread sequences and executes the at least allocated thread allocated by the thread control unit, wherein the processor control unit supplies a kind of an instruction to be executed by a self-processor, in which the processor control unit is provided, to the instruction execution unit and the data dependence detector which are provided in the self-processor, and as well as to at least a processor other than the self-processor, the data dependence detector receives the kind of the instruction to be executed by the self-processor, and also receives kinds of instructions to be executed by the other processor from processor control units provided in the other processor; if the instruction to be executed is either a load instruction or a store instruction, the processor control unit supplies an address of the instruction to the instruction execution unit and the data dependence detector which are provided in the self-processor, and as well as to the other processor the data dependence detector includes the same number of address converter as a total number of the processors included in the system, an instruction history storing unit and a logic circuit; the data dependence detector judges whether the self-processor is in a definitive execution state or a speculative execution state based on the speculative execution flag supplied from the thread control unit; the data dependence detector judges, whether the thread executed by the self-processor is prior in program sequence to a respective thread executed by the other processor, based on the thread sequences, and the data dependence detector supplies a data dependence detected result to the thread control unit; one of the address converters converts an address of a load instruction to be executed by the self-processor into an entry number of the instruction history storing unit, and remaining of the address converters converts an address of a store instruction to be executed by the other processor into an entry number of the instruction history storing unit; the instruction history storing unit comprises a plurality of entry, a single write port and plural read ports which number is smaller by one than the total number of the processors; the address converter, which has an input port for receiving the address of the instruction to be executed by the self-processor, has an output port connected to the write port of the instruction history storing unit for write operation into an entry designated by the entry number of the instruction history storing unit; the address converter, which has an input port for receiving the address of the instruction to be executed by the other processor, has an output port connected to the read port of the instruction history storing unit for read operation from an entry designated by the entry number of the instruction history storing unit; and the logic circuit operates a logical-OR of the plural read ports of the address converter and supplies an operated logic value as a data dependence detected result to the thread control unit.

It is possible that the data dependence detector initializes all of the entries of the instruction history storing unit based on the speculative execution flag.

It is possible that if the self-processor is in the speculative execution state and the load instruction has speculatively been executed by the self-processor, then the address converter in the data dependence detector converts an address of the load instruction into an entry number of the instruction history storing unit and supplies the entry number to the write port of the instruction history storing unit, so that the instruction history storing unit sets a value indicating, that the load instruction has speculatively been executed, at an entry designated by the entry number, if the self-processor is in the speculative execution state and the store instruction has been executed by other processor which is allocated with a prior thread which is prior in program sequence to a thread executed by the self-processor, then the address converter in the data dependence detector converts an address of the store instruction into an entry number of the instruction history storing unit and supplies the entry number to corresponding one of the input ports of the instruction history storing unit, so that the instruction history storing unit reads a content from an entry designated by the entry number and supplies the content to the logic circuit the logic circuit operates a logical-OR of the plural read ports of the address converter and supplies an operated logic value as a data dependence detected result to the thread control unit.

It is possible that if an address of a store instruction executed by other processor allocated with a prior thread which is prior in program sequence to a thread executed by the self-processor is either equal to an address of a load instruction subjected to a data dependence speculative execution by the self-processor or allocated to the same entry of the instruction history storing unit due to appearance of areas, then a value indicating, that the load instruction subjected to the data dependence speculative execution is present, is read out from the instruction history storing unit, a possibility of presence of a read after write dependence is detected, and the data dependence detector supplies a value indicating failure of the data dependence speculative execution to the thread control unit, the thread control unit receives a notice of failure of the data dependence speculative execution from either one of the processors, and the thread control unit sends a request for recovery process against failure of the data dependence speculative execution to a processor which has supplied the notice of failure of the data dependence speculative execution as well as to a processor executing a thread which is post in program sequence to a thread executed by the processor which has supplied the notice, and the processor control unit of the processor receives the request for the recovery process to failure of the data dependence speculative execution.

A sixth aspect of the present invention is a semiconductor integrated circuit including a detector for detecting at least one kind of dependence in address between instructions executed by at least a processor, the detector being adopted to detect a possibility of presence of the at least one kind of dependence, wherein if the at least one kind of dependence is present in fact, then the detector detects a possibility of presence of the at least one kind of dependence, and if the at least one kind of dependence is not present in fact, then the detector is allowed to detect the at least one kind of dependence.

It is possible that the instruction comprises a memory access instruction for access to a memory.

It is possible that the detector includes: an execution history storing unit including a plurality of entry which stores an instruction execution information of whether the memory access instruction has been executed; and an address converter for converting an address of the memory access instruction into an entry number of the entry of the execution history storing unit, so that the execution history storing unit stores the instruction execution information into the entry designated by the entry number.

It is possible that the address converter is adopted to convert a same address of different memory access instructions into a same entry number for allowing that the same address for the different memory access instructions is stored in the same entry, whereby if the at least one kind of dependence is not present in fact, then the detector is adopted to detect the at least one kind of dependence.

It is possible that the memory access instruction comprises either a load instruction or a store instruction.

It is possible that the one kind of the dependence is a read after write dependence, and if the load instruction has been executed, then the address converter is adopted to convert an address of the load instruction into an entry number, and the detector stores an instruction execution information, that the load instruction has been executed, into the entry designated by the entry number of the execution history storing unit, and if the store instruction has been executed, then the address converter is adopted to convert an address of the store instruction into an entry number, and the detector reads an instruction execution information, whether or not the load instruction has been executed, out from the entry designated by the entry number of the execution history storing unit, whereby the detector detects a possibility of presence of the read after write dependence from the store instruction as executed into the load instruction as executed.

It is possible that the one kind of the dependence is a write after read dependence, and if the store instruction has been executed, then the address converter is adopted to convert an address of the store instruction into an entry number, and the detector stores an instruction execution information, that the store instruction has been executed, into the entry designated by the entry number of the execution history storing unit, and if the load instruction has been executed, then the address converter is adopted to convert an address of the load instruction into an entry number, and the detector reads an instruction execution information, whether or not the store instruction has been executed, out from the entry designated by the entry number of the execution history storing unit, whereby the detector detects a possibility of presence of the write after read dependence from the load instruction as executed into the store instruction as executed.

It is possible that the one kind of the dependence is an write after write dependence, and if the store instruction has been executed, then the address converter is adopted to convert an address of the store instruction into an entry number, and the detector reads an instruction execution information, whether or not the store instruction has been executed, out from the entry designated by the entry number of the execution history storing unit, and also the detector stores an instruction execution information, that the store instruction has been executed, into the entry designated by the entry number of the execution history storing unit, whereby the detector detects a possibility of presence of the write after write dependence between the store instructions as executed.

It is possible that the one kind of the dependence is a read after write dependence, a write after read dependence and an write after write dependence and if the load instruction has been executed, then the address converter is adopted to convert an address of the load instruction into an entry number, and the detector reads an instruction execution information, whether or not the store instruction has been executed, from the entry designated by the entry number of the execution history storing unit, and also the detector stores an instruction execution information, that the load instruction has ben executed, into the entry designated by the entry number of the execution history storing unit, and if the store instruction has been executed, then the address converter is adopted to convert an address of the store instruction into an entry number, and the detector reads instruction execution informations, whether or not the load instruction has been executed and whether or not the store instruction has been executed, out from the entry designated by the entry number of the execution history storing unit, and also the detector stores an instruction execution information, that the store instruction has been executed into the entry designated by the entry number of the execution history storing unit, whereby the detector detects a possibility of presence of the read after write dependence from the store instruction as executed into the load instruction as executed, and also detects a possibility of presence of the write after read dependence from the load instruction as executed into the store instruction as executed as well as detects a possibility of presence of the write after write dependence between the store instructions as executed.

It is possible that the address converter is adopted to select plural bits of the address inputted and output the plural bits as indicating the entry number.

It is possible that the address converter is adopted to take an exclusive-OR of the selected plural bits and output a value of the exclusive-OR as indicating the entry number.

A seventh aspect of the present invention is a semiconductor integrated circuit including a detector provided in a self-processor included in a multiple processor system including the self-processor and at least a processor other than the self-processor, and the multiple processor system performing parallel processings in thread units of program, and the detector detecting at least one kind of dependence in address between an instruction included in a thread executed by the self-processor and an instruction included in a thread executed by the other processor, the detector being adopted to detect a possibility of presence of the at least one kind of dependence, wherein if the at least one kind of dependence is present in fact, then the detector detects a possibility of presence of the at least one kind of dependence, and if the at least one kind of dependence is not present in fact, then the detector is allowed to detect the at least one kind of dependence.

It is possible that the instruction comprises a memory access instruction for access to a memory.

It is possible that the detector includes an execution history storing unit including a plurality of entry which stores an instruction execution information of whether the memory access instruction has been executed; and an address converter for converting an address of the memory access instruction into an entry number of the entry of the execution history storing unit, so that the execution history storing unit stores the instruction execution information into the entry designated by the entry number.

It is possible that the address converter is adopted to convert a same address of different memory access instructions into a same entry number for allowing that the same address for the different memory access instructions is stored in the same entry, whereby if the at least one kind of dependence is not present in fact, then the detector is adopted to detect the at least one kind of dependence.

It is possible that only if the memory access instruction has been executed by other processor than the self-processor, and the other processor is to execute a thread which is prior in program sequence to the thread executed by the self-processor, then the address converter is adopted to convert an address of the memory access instruction into an entry number of the entry, and the detector reads an instruction execution information, whether or not the memory accesses instruction has been executed, from an entry designated by the entry number.

It is possible that if the memory access instruction has been executed by other processor than the self-processor, then the address converter is adopted to convert an address of the memory access instruction pinto an entry number of the entry, and the detector reads an instruction execution information, whether or not the memory accesses instruction has been executed, from an entry designated by the entry number by referring only a value which has been read out by the memory access instruction which had been executed by other processor executing a thread which is prior in program sequence to the thread executed by the self-processor.

It is possible that the memory access instruction comprises either a load instruction or a store instruction.

It is possible that the one kind of the dependence is a read after write dependence, and if the load instruction has been executed by the self-processor, then the address converter is adopted to convert an address of the load instruction into an entry number, and the detector stores an instruction execution information, that the load instruction has been executed by the self-processor, into the entry designated by the entry number of the execution history storing unit, and if the store instruction has been executed by the other processor, then the address converter is adopted to convert an address of the store instruction into an entry number, and the detector reads an instruction execution information, whether or not the load instruction has been executed by the self-processor, out from the entry designated by the entry number of the execution history storing unit, whereby the detector detects a possibility of presence of the read after write dependence from the store instruction as executed by the other processor into the load instruction as executed by the self-processor.

It is possible that the one kind of the dependence is a write after read dependence, and if the store instruction has been executed by the self-processor, then the address converter is adopted to convert an address of the store instruction into an entry number, and the detector stores an instruction execution information, that the store instruction has been executed by the self-processor, into the entry designated by the entry number of the execution history storing unit, and if the load instruction has been executed by the other processor, then the address converter is adopted to convert an address of the load instruction into an entry number, and the detector reads an instruction execution information, whether or not the store instruction has been executed by the self-processor, out from the entry designated by the entry number of the execution history storing unit, whereby the detector detects a possibility of presence of the write after read dependence from the load instruction as executed by the other processor into the store instruction as executed by the self-processor.

It is possible that the one kind of the dependence is an write after write dependence, and if the store instruction has been executed by the other processor, then the address converter is adopted to convert an address of the store instruction into an entry number, and the detector reads an instruction execution information, whether or not the store instruction has been executed by the self-processor, out from the entry designated by the entry number of the execution history storing unit, if the store instruction has been executed by the self-processor, then the address converter is adopted to convert an address of the store instruction into an entry number, and the detector stores an instruction execution information, that the store instruction has been executed by the self-processor, into the entry designated by the entry number of the execution history storing unit, whereby the detector detects a possibility of presence of the write after write dependence from the store instruction as executed by the other processor to the store instruction as executed by the self-processor.

It is possible that the one kind of the dependence is a read after write dependence, a write after read dependence and an write after write dependence and if the load instruction has been executed by the other processor, then the address converter is adopted to convert an address of the load instruction into an entry number, and the detector reads an instruction execution information, whether or not the store instruction has been executed by the self-processor, from the entry designated by the entry number of the execution history storing unit, if the store instruction has been executed by the other processor, then the address converter is adopted to convert an address of the store instruction into an entry number, and the detector reads an instruction execution information, whether or not the load instruction has been executed by the self-processor, from the entry designated by the entry number of the execution history storing unit, if the load instruction has been executed by the self-processor, then the address converter is adopted to convert an address of the load instruction into an entry number, and the detector stores an instruction execution information, that the load instruction has been executed by the self-processor, into the entry designated by the entry number of the execution history storing unit, if the store instruction has been executed by the self-processor, then the address converter is adopted to convert an address of the store instruction into an entry number, and the detector stores an instruction execution information, that the store instruction has been executed by the self-processor, into the entry designated by the entry number of the execution history storing unit, whereby the detector detects a possibility of presence of the read after write dependence from the store instruction as executed by the other processor into the load instruction as executed by the self-processor, and also detects a possibility of presence of the write after read dependence from the load instruction as executed by the other processor into the store instruction as executed by the self-processor as well as detects a possibility of presence of the write after write dependence from the store instruction as executed by the other processor into the store instruction as executed by the self-processor.

It is possible that the address converter is adopted to select plural bits of the address inputted and output the plural bits as indicating the entry number.

It is possible that the address converter is adopted to take an exclusive-OR of the selected plural bits and output a value of the exclusive-OR as indicating the entry number.

An eighth aspect of the present invention is a semiconductor integrated circuit including a detector provided in a self-processor included in a multiple processor system including the self-processor and at least a processor other than the self-processor, and the multiple processor system performing parallel processings in thread units of program, and the detector detecting at least one kind of dependence in address between an instruction included in a thread executed by the self-processor and an instruction included in a thread executed by the other processor, the detector being adopted to detect a possibility of presence of the at least one kind of dependence, as well as the detector detecting at least one kind of dependence in address between instructions included in a thread executed by the self-processor, wherein if the at least one kind of dependence is present in fact, then the detector detects a possibility of presence of the at least one kind of dependence, and if the at least one kind of dependence is not present in fact, then the detector is allowed to detect the at least one kind of dependence.

It is possible that the instruction comprises a memory access instruction for access to a memory.

It is possible that the detector includes an execution history storing unit including a plurality of entry which stores an instruction execution information of whether the memory access instruction has been executed; and an address converter for converting an address of the memory access instruction into an entry number of the entry of the execution history storing unit, so that the execution history storing unit stores the instruction execution information into the entry designated by the entry number.

It is possible that the address converter is adopted to convert a same address of different memory access instructions into a same entry number for allowing that the same address for the different memory access instructions is stored in the same entry, whereby if the at least one kind of dependence is not present in fact, then the detector is adopted to detect the at least one kind of dependence.

It is possible that only if the memory access instruction has been executed by other processor than the self-processor, and the other processor is to execute a thread which is prior in program sequence to the thread executed by the self-processor, then the address converter is adopted to convert an address of the memory access instruction into an entry number of the entry, and the detector reads an instruction execution information, whether or not the memory accesses instruction has been executed, from an entry designated by the entry number.

It is possible that if the memory access instruction has been executed by other processor than the self-processor, then the address converter is adopted to convert an address of the memory access instruction into an entry number of the entry, and the detector reads an instruction execution information, whether or not the memory accesses instruction has been executed, from an entry designated by the entry number by referring only a value which has been read out by the memory access instruction which had been executed by other processor executing a thread which is prior in program sequence to the thread executed by the self-processor.

It is possible that the memory access instruction comprises either a load instruction or a store instruction.

It is possible that the one kind of the dependence is a read after write dependence, and if the load instruction has been executed by the self-processor, then the address converter is adopted to convert an address of the load instruction into an entry number, and the detector stores an instruction execution information, that the load instruction has been executed by the self-processor, into the entry designated by the entry number of the execution history storing unit, and if the store instruction has been executed by either the self-processor or the other processor, than the address converter is adopted to convert an address of the store instruction into an entry number, and the detector reads an instruction execution information, whether or not the load instruction has been executed by the self-processor, out from the entry designated by the entry number of the execution history storing unit, whereby the detector detects a possibility of presence of the read after write dependence from the store instruction as executed by either the self-processor or the other processor into the load instruction as executed by the self-processor.

It is possible that the one kind of the dependence is a write after read dependence, and if the store instruction has been executed by the self-processor, then the address converter is adopted to convert an address of the store instruction into an entry number, and the detector stores an instruction execution information, that the store instruction has been executed by the self-processor, into the entry designated by the entry number of the execution history storing unit, and if the load instruction has been executed by either the self-processor or the other processor, then the address converter is adopted to convert an address of the load instruction into an entry number, and the detector reads an instruction execution information, whether or not the store instruction has been executed by the self-processor, out from the entry designated by the entry number of the execution history storing unit, whereby the detector detects a possibility of presence of the write after read dependence from the load instruction as executed by either the self-processor or the other processor into the store instruction as executed by the self-processor.

It is possible that the one kind of the dependence is an write after write dependence, and if the store instruction has been executed by the other processor, then the address converter is adopted to convert an address of the store instruction into an entry number, and the detector reads an instruction execution information, whether or not the store instruction has been executed by the self-processor, out from the entry designated by the entry number of the execution history storing unit, if the store instruction has been executed by the self-processor, then the address converter is adopted to convert an address of the store instruction into an entry number, and the detector reads an instruction execution information, whether or not the store instruction has been executed by the self-processor, out from the entry designated by the entry number of the execution history storing unit, as well as the detector stores an instruction execution information, that the store instruction has been executed by the self-processor, into the entry designated by the entry number of the execution history storing unit, whereby the detector detects a possibility of presence of the write after write dependence from the store instruction as executed by either the self-processor or the other processor to the store instruction as executed by the self-processor.

It is possible that the one kind of the dependence is a read after write dependence, a write after read dependence and an write after write dependence and if the load instruction has been executed by either the self-processor or the other processor, then the address converter is adopted to convert an address of the load instruction into an entry number, and the detector reads an instruction execution information, whether or not the store instruction has been executed by the self-processor, from the entry designated by the entry number of the execution history storing unit, if the store instruction has been executed by either the self-processor or the other processor, then the address converter is adopted to convert an address of the store instruction into an entry number, and the detector reads an instruction execution information, whether or not the load instruction has been executed by the self-processor, from the entry designated by the entry number of the execution history storing unit, if the load instruction has been executed by the self-processor, then the address converter is adopted to convert an address of the load instruction into an entry number, and the detector stores an instruction execution information, that the load instruction has been executed by the self-processor, into the entry designated by the entry number of the execution history storing unit, if the store instruction has been executed by the self-processor, then the address converter is adopted to convert an address of the store instruction into an entry number, and the detector stores an instruction execution information, that the store instruction has been executed by the self-processor, into the entry designated by the entry number of the execution history storing unit, whereby the detector detects a possibility of presence of the read after write dependence from the store instruction as executed by either the self-processor or the other processor into the load instruction as executed by the self-processor, and also detects a possibility of presence of the write after read dependence from the load instruction as executed by either the self-processor or the other processor into the store instruction as executed by the self-processor as well as detects a possibility of presence of the write after write dependence from the store instruction as executed by either the self-processor or the other processor into the store instruction as executed by the self-processor.

It is possible that the address converter is adopted to select plural bits of the address inputted and output the plural bits as indicating the entry number.

It is possible that the address converter is adopted to take an exclusive-OR of the selected plural bits and output a value of the exclusive-OR as indicating the entry number.

First Embodiment

Figure 3:
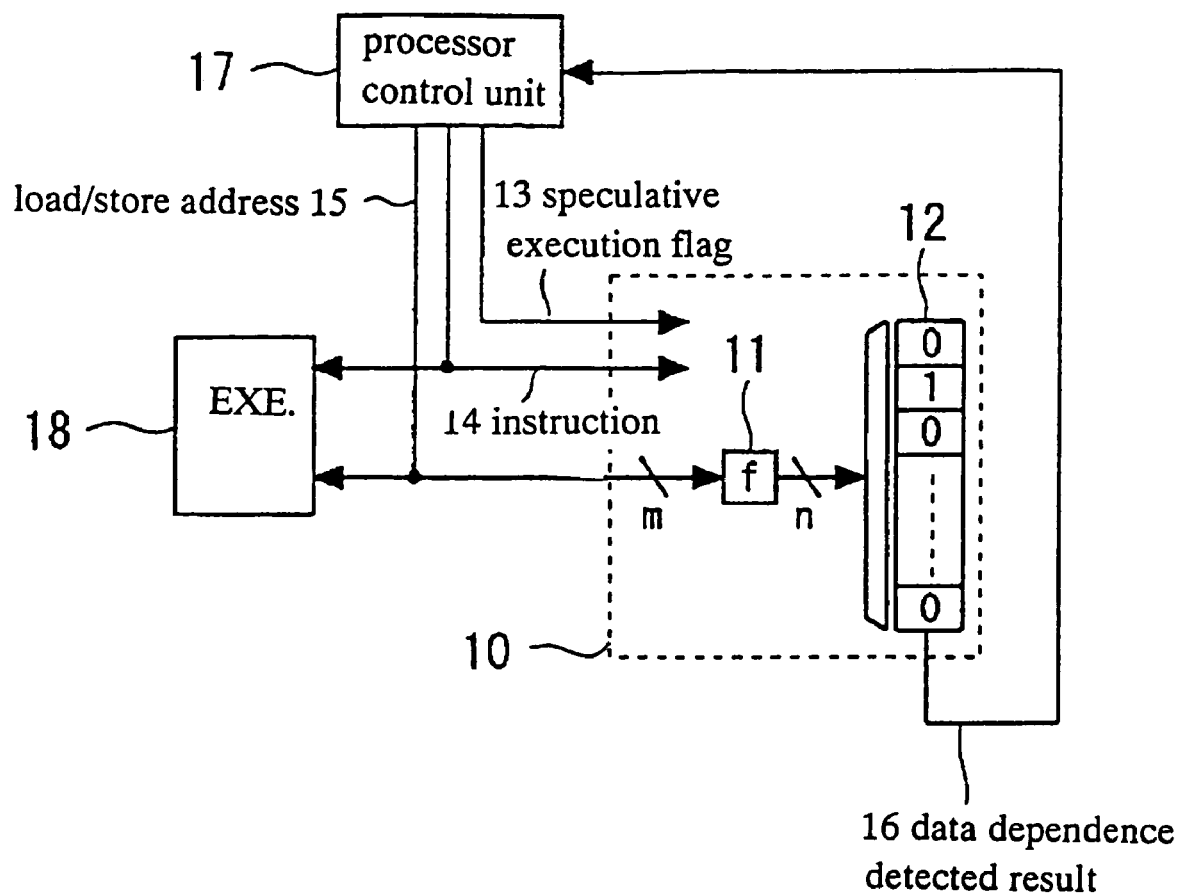
FIG. 3 is a schematic view of an internal configuration of a data processor including a data dependence detector in a first embodiment in accordance with the present invention.

A first embodiment according to the present invention will be described in detail with reference to the drawings. FIG. 3 is a schematic view of an internal configuration of a data processor including a data dependence detector in a first embodiment in accordance with the present invention. The data processor includes a processor control unit 17, an instruction execution unit 18 and a data dependence detector 10 and other units usually provided in the data processor but not relevant to the present invention.

In order to cause the processor to execute the instruction, the processor control unit 17 supplies the instruction execution unit 18 and the data dependence detector 10 with the type of the instruction to be executed. The data dependence detector 10 receives the type of the instruction through an execution instruction 14.

If the type of the instruction relates to a load instruction or a store instruction, then the processor control unit 17 supplies its address for loading and storing data to the data dependence detector 10 and the instruction execution unit 18. The data dependence detector 10 receives the input of the address through a load/store instruction 15.

If the load instruction or the store instruction is subjected to a data dependence speculative execution, then the processor control unit 17 informs the data dependence detector 10 of a notice to the effect that the load instruction or the stoic instruction is subjected to a data dependence speculative execution.

The data dependence detector 10 may further include a hash function circuit 11 and an instruction history table 12. The data dependence detector 10 has three inputs of the speculative execution flag 13, the execution instruction 14 and the load/store instruction 15, which are supplied from the processor control unit 17. The data dependence detector 10 has an output of the data dependence detected result 16 which is supplied to the processor control unit 17.

The hash function circuit 11 comprises a logic circuit for realizing a hash function "f" which converts m-bits address for the load instruction or the store instruction into an n-bit entry number for the instruction history table 12, wherein "n" is usually smaller than "m". The hash function "f" takes the same value for the same input. If N1=f(A1) and if N2=f(A2), then N1=N2, provided that A1=A2. The hash Function circuit 11 ensures to output the same entry number of the instruction history table for the same address of the load/store instructions.

If A1≠A2, then generally N1≠N2 is not ensured. It is possible that the same entry number of the instruction history table 12 may exist for the different addresses for the load/store instructions.

The instruction history table 12 may comprise plural entries, each of which stores one-bit information. Each of the plural entries may be realized by any available storage means, for example, a memory or a flip-flop. If the output from the hash function circuit 11 has an n-bit width, then a total number of the entries is equal to then-power of 2. The instruction history table 12 performs a read/write operation to the entry designated by the entry number which has been outputted from the hash function circuit 11.

The instruction history table 12 is capable of initializing all of the entries upon receipt of the input of the speculative execution flag 13, wherein the same number is written into all of the entries.

Figure 4:
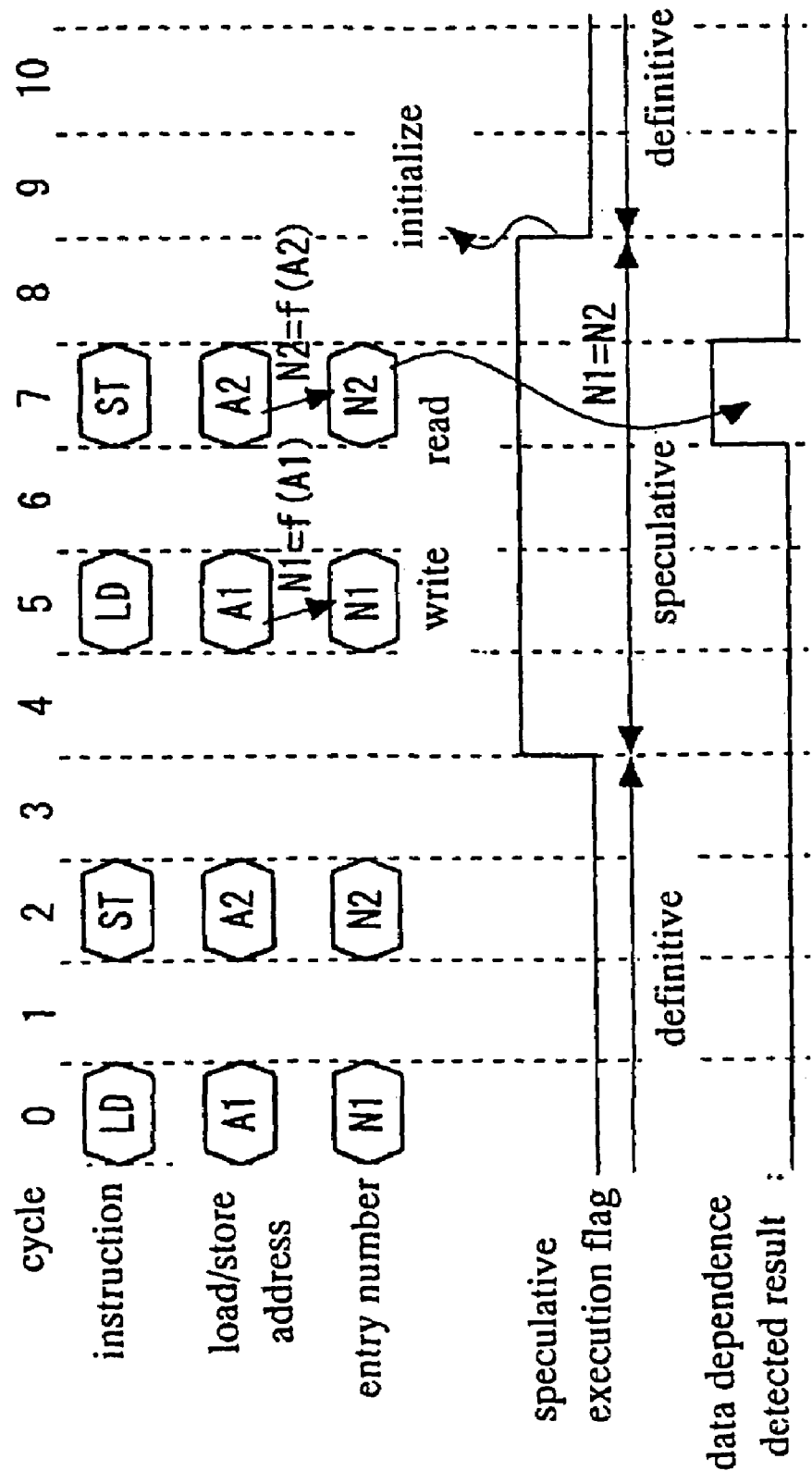
FIG. 4 is a timing chart showing operations of the data dependence detector.

Operations of the data dependence detector 10 will be described with reference to FIGS. 3 and 4. FIG. 4 is a timing chart showing operations of the data dependence detector.

In an initial state, all of the entries of the instruction history table 12 are in the first state, for example, logic "0" or "L" which indicates that the load instruction has not been executed. If the processor does not perform the speculative instruction execution to the data dependence and does perform the instruction execution in the order defined by the program (hereinafter referred to as "definitive execution state", then the data dependence detector 10 does not perform any operation. In FIG. 4, cycles "0" to "3" correspond to the definitive execution state.

If the processor does perform the speculative instruction execution to the data dependence and does not perform the instruction execution in the order defined by the program (hereinafter referred to as "speculative execution state", then the data dependence detector 10 does perform a detecting process for a read after write dependence from the store instruction to the load instruction. In FIG. 4, cycles "4" to "8" correspond to the speculative execution state.

The speculative execution flag 13 indicates whether the processor is in the definitive execution state or the speculative execution state. In FIG. 4, if the speculative execution flag 13 is the logical value "0", then this indicates the definitive execution state of the processor. The logical value "1" of the speculative execution flag 13 indicates the speculative execution state of the processor.

If the speculative load instruction is executed in the speculative execution state (cycle 5), then the data dependence detector 10 stores, into the instruction history table 12, an information to the effect that the load instruction has speculatively been executed. In more detail, the address "A1" of the load instruction is converted by the hash function circuit 11 into the entry number "N1" which is inputted into the instruction history table 12. The instruction history table 12 converts a corresponding entry to the inputted entry number "N1" into a second state, for example, a logical value "1" or "11" which indicates that the load instruction has speculatively been executed.

If the load instruction has speculatively been executed (cycle 7), then the data dependence detector 10 reads out the state stored in the corresponding entry. In more detail, the address "A2" of the store instruction is converted by the hash function circuit 11 into the entry number N2 which is inputted into the instruction history table 12. The instruction history table 12 reads out the content of the entry designated by the inputted entry number N2, and sends the read out contact through the data dependence detected result 16 to the processor control unit 17.

If the address "A1" of the load instruction executed in the cycle 5 is equal to the address "A2" of the load instruction executed in the cycle 7 (A1=A2), then the respectively corresponding entry numbers N1 and N2 are equal to each other in accordance with the property of the hash function circuit 11. The logical value "1" stored in the entry "N1" of the instruction history table 12 by the load instruction in the cycle 5 is read out from the instruction history table 12 by the store instruction executed in the cycle 7. Thus, there is detected a possibility that the read after write dependence may be present from the store instruction executed in the cycle 7 to the load instruction executed in the cycle 5.

What is detected here is not "the read after write dependence exists" but is "there is a possibility of existence of the read after write dependence" because it is possible that the read alter write dependence is not present even the value indicating the execution of the speculative load instruction has been read out from the instruction history table 12 by the store instruction.

In any event, the possibility of presence of the read after write dependence is detected, the data dependence detector 10 supplies the data dependence detected result 16 with a value, for example, logical value "1" which indicates that the data dependence speculative execution has not been succeeded. The processor control unit 17 and the instruction execution 18 execute the necessary recovery processes to the failure of the data dependence speculative execution.

If the address "A1" of the load instruction executed in the cycle 5 is different from the address "A2" of the load instruction executed in the cycle 7 (A1≠A2), the e, in accordance with the property of the hash function circuit 11, there are both cases that the respectively corresponding entry numbers N1 and N2 different from each other, and that the respectively corresponding entry numbers N1 and N2 are equal to each other.

In case that the respectively corresponding entry numbers N1 and N2 are different from each other, when the store instruction is executed in the cycle 7, the entry N2 of the instruction history table 12 has the initial value, for example, "0". It is detected that the read after write dependence is not present from the store instruction executed in the cycle 7 to the load instruction executed in the cycle 5. In this case, the data dependence detector 10 supplies the data dependence detected result 16 with a value, for example, logical value "0" which indicates that the data dependence speculative execution has been succeeded. The processor control unit 17 does not execute the recovery processes because of the success of the data dependence speculative execution and will execute the subsequent instructions.

In case that the respectively corresponding entry numbers N1 and N2 are equal to each other, the load instruction in the cycle 5 and the store instruction in the cycle 7 refer the same entry (N1=N2) of the instruction history table 12. Even the address "A1" of the load instruction is different from the address "A2" of the store instruction and the read after write dependence from the store instruction to the load instruction is not present, then when the store instruction is executed in the cycle 7, the logic "1" having been written by the load instruction in the cycle 5 is read out from the instruction history table 12. It is detected that the possibility of existence of the read after write dependence is present from the store instruction executed in the cycle 7 to the load instruction executed in the cycle 5. In this case, the data dependence detector 10 supplies the data dependence detected result 16 with a value, for example, logical value "1" which indicates that the data dependence speculative execution has not been succeeded. The processor control unit 17 and the instruction execution unit 18 do execute the recovery processes to the failure of the data dependence speculative execution. What different addresses are allocated to the same entry of the instruction history table will hereinafter be referred to as "areas are generated".

In case of generation of the areas between the load instruction and the store instruction, the processor control unit 17 is notified of a notice to the effect that the read after write dependence has been present even if the read after write dependence has actually been not present. The unnecessary recovery process is thus executed. The means on the program is, however, unchanged. Accordingly, the correctness of the execution result of the program can be ensured.

The execution of the unnecessary recovery process reduces the executive performance of the program. It is, however, possible to reduce the probability of generation of the areas by appropriate selection of the hash function of the hash function circuit 11 and by a sufficiently large number of the entries on the instruction history table 12. A sufficiently small probability of generation of the areas allows a substantive improvement of the executive performance of the program due to the effect of the data dependence speculative execution.

It is possible that the areas may be generated between the load instructions. If, for example, a load instruction "LD1" with an address "A1" and a load instruction "LD2" with an address "A2" different from the address "A1" are executed, then it is possible that such areas are generated that referred entries "N1" and "N2" are equal to each other. In this case, the logic "1" indicating that the load instruction has been executed is stored into the same entry N1 (=N2) of the instruction history table 12.

If the store instruction has been executed for the address "A1" or "A2" having the read after write dependence on the load instruction "LD1" or "LD2", then the entry N1 (=N2) on the instruction -history table is referred to detect the presence of the read after write dependence, provided that it is impossible to distinguish the read after write dependence belongs to the load instruction "LD1" or "LD2".

The presence of the read after write dependence is surely detected for executing the recovery process to the failure of the data dependence speculative. As a result, the correctness of the executed result of the program is ensured.

As described above, the data dependence detector does not strictly detect the presence of the read after write dependence from the store instruction to the load instruction. The data dependence detector does detect the possibility of the presence of the read after write dependence from the store instruction to the load instruction.

The addresses of the load instructions are allocated by the hash function circuit 11 into a specific entry of the instruction history table 12 with overlap, for which reason it is unnecessary to store all of the addresses of the executed load instructions and also to provide any address comparator for comparing those addresses to the addresses of the store instructions.

The data dependence detector provides an effect that the necessary hardware size for judging the success or the failure of the data dependence speculative execution is small. The number of the load instructions which may be subjected to the data dependence speculative execution is not limited by the hardware size of the data dependence detector. The small hardware size allows the improvement in executive performance of the data dependence speculative execution.

The data dependence detector also provides another effect that it is unnecessary to compare the address of the store instruction and the address of the load instruction in the detection process for the read after write dependence in the execution of the store instruction.

Further, only one entry is to be read out from the instruction history table, for which reason it is unnecessary to operate the logical-OR. The necessary time for detecting the read after write dependence is short and it is easy to obtain desirable high speed and high frequency performances of the processor.

Figure 5:
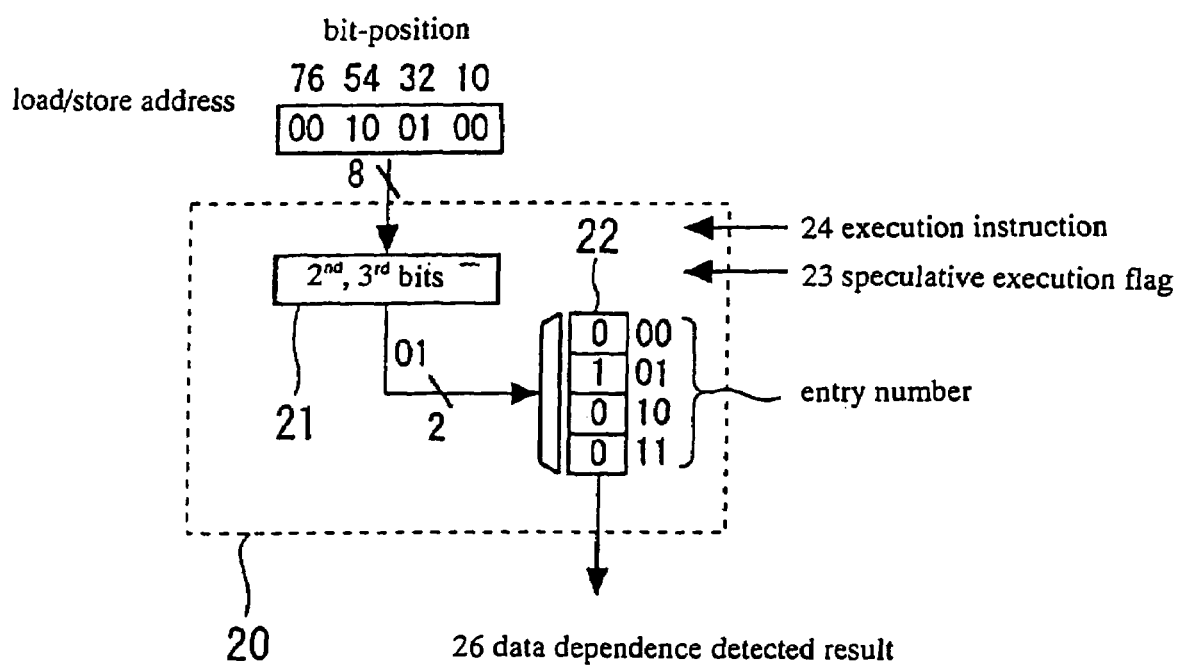
FIG. 5 is a block diagram illustrative of a structure of the data dependence detector.

An example of the operation of the data dependence detector will be described with reference to FIG. 5 which is a block diagram illustrative of a structure of the data dependence detector. A data dependence detector 20 comprises a hash function circuit 21 and an instruction history table 22. The data dependence detector 20, the hash function circuit 21 and the instruction history table 22 in FIG. 5 correspond to the data dependence detector 10, the hash function circuit 11 and the instruction history table 12 in FIG. 3. An execution instruction 24, a speculative execution flag 23 and a data dependence detected result 26 in FIG. 5 correspond to the execution instruction 14, the speculative execution flag 13 and the data dependence detected result 16 in FIG. 3. The data dependence detector 20 has inputs of the speculative execution flag, the execution instruction and the load/store instruction which are supplied from the processor control unit. The data dependence detector 20 has an output of the data dependence detected result which is supplied to the processor control unit. The address for the load/store instruction comprises 8-bits.

Figure 7A:
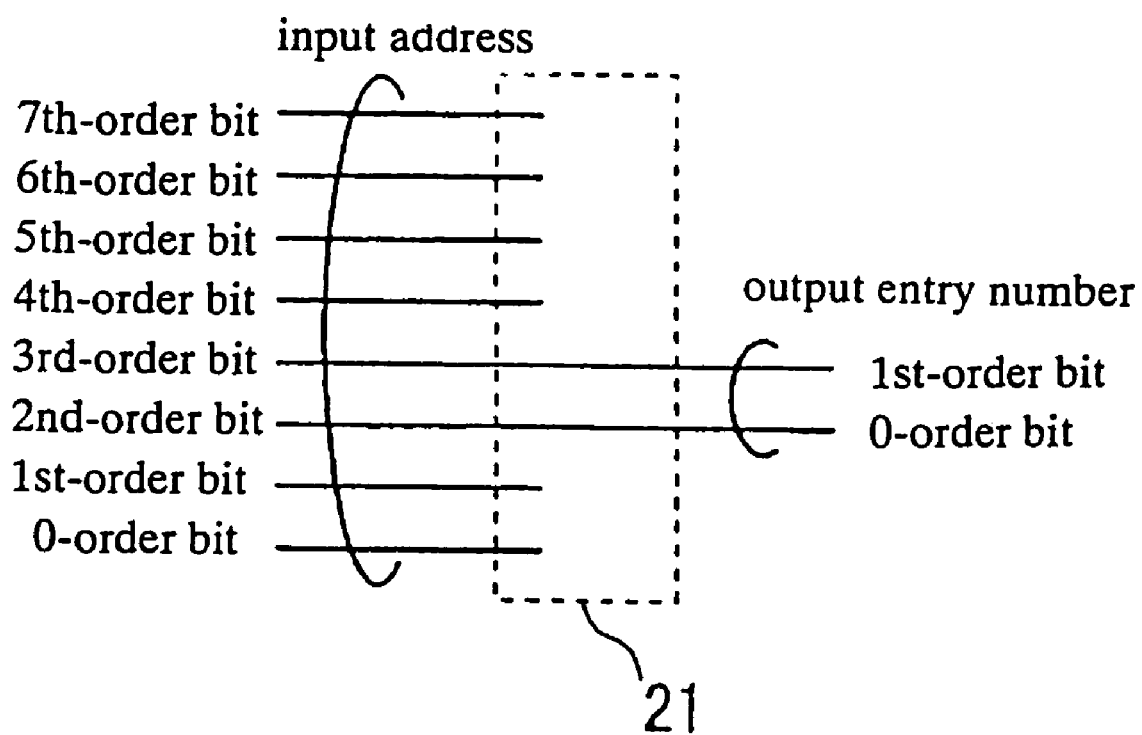
FIG. 7A is a diagram illustrative of a first example of the hash function circuit in the first embodiment in accordance with the present invention.

FIG. 7A is a diagram illustrative of a first example of the hash function circuit in the first embodiment in accordance with the present invention. The address of the load/store instruction comprises 8-bits. The hash function circuit 21 fetches the second and third bits directly for conversion into the entry number which is represented by 2-bits on the instruction history table 22. The instruction history table 22 comprises four entries. The read and write operations are executed with reference to the 2-bits entry number outputted from the hash function circuit 21 as well as the execution instruction and the speculative execution flag outputted from the processor control unit.

FIG. 6A is a diagram illustrative of the instruction program sequence involved in operations of the data dependence detector. The instruction program sequence is the load instruction "LD1", the store instruction "ST1", the load instruction "LD2", the load instruction "LD3", and the load instruction "LD4". The load instruction "LD1" has an address "A1". The load instruction "LD2" has an address "A2". The load instruction "LD3" has an address "A3". The load instruction "LD4" has an address "A4". The store instruction "ST1" has an address "A4". The load instruction "LD4" and the Store instruction "ST1" have the same address "A4". The store instruction "ST1" is prior to the load instruction "LD4". A data dependence is present from the store instruction "ST1" to the load instruction "LD4". The store instruction "ST1" is executed before the load instruction "LD4" is executed. The correctness of the result of execution of the program is not ensured unless the content written at the address "A4" in the store instruction "ST1" is read out in the load instruction "LD4".

If the processor is in the data dependence speculative execution state, the instructions are executed in the sequence of having become executable even the presence of the read after write dependence from the store instruction to the load instruction has not been conformed FIG. 6B is a diagram illustrative of the instruction execution sequence involved in operations of the data dependence detector. The instruction execution sequence is a non-program sequence execution or the data dependence speculative execution of the instruction columns of the program sequence. Cycle number, execution instruction, and address of the execution instruction are shown. In the first cycle 1, the load instruction "LD1" is executed at an address "A1=00100000". In the second cycle 2, the load instruction "LD2" is executed at an address "A2=00101000". In is the third cycle 3, the load instruction "LD3" is executed at an address "A3=00001100". In the fourth cycle 4, the load instruction "LD4" is executed at an address "A4=00010000". In the fifth cycle 5, the store instruction "ST1" is executed at the same address "A4=0001000" as the load instruction "LD4".

The store instruction "ST1" and the load instruction "LD4" should have to have the read after write dependence onto each other, wherein the store instruction "ST1" should have to be executed prior to the load instruction "LD4". Notwithstanding, it is the fact that the store instruction "ST1" has been executed after the load instruction "LD4" with the violation to the read after write dependence. This means that the data dependence speculative execution is not succeeded. The load instruction "LD4" is read out a value from the address "A4", wherein this value is not the value written by the store instruction "ST1" at the address "A4", and this value is the previous value to the value written by the store instruction "ST1" at the address "A4". For this reason, the correctness of the executed result is not ensured.

The data dependence detector 20 detects this failure of the data dependence speculative execution and then notifies this detected result through the data dependence detected result 16 to the processor control unit 17. The processor control unit 17 performs the recovery process for the failure of the data dependence speculative execution in order to obtain the corrective executed result.

FIG. 6C is a diagram illustrative of the data dependence detective unit involved in operations of the data dependence detector with reference to the instruction execution sequence. Cycle number, speculative execution flags, entry numbers on the instruction history table referred by the load/store instruction executed, state of the instruction history table are shown. For the states of the instruction history table 22, contents on the entries "00", "01", "10" and "11" are shown.

For example, in zero cycle "0", the speculative execution flag has the logical "0". The load and store instructions are not executed. The instruction history table 22 is in the initial state. The contents of the four entries are logical "0" which indicates that the load instruction has not been executed.

From the first cycle 1 to the fifth cycle 5, the processor is in the speculative execution state, wherein the speculative execution flag takes the logical "1".

In the first cycle 1, the load instruction "LD1" is subjected to the data dependence speculative execution. The hash function circuit 21 takes the second and third bits of the address "A1=00100000" for the load instruction "LD1" and outputs the entry number "00" to be referred by the instruction history table 22. The instruction history table 22 refers the entry number "00" outputted from the hash function circuit 21 and also refers the execution instruction and the speculative execution flag, and the instruction history table 22 writes the logical "1" which indicates that the load instruction has been executed as the content of the entry "00".

In the second cycle 2, the load instruction "LD2" is subjected to the data dependence speculative execution. The hash function circuit 21 takes the second and third bits of the address "A2=0010000" for the load instruction "LD2" and outputs the entry number "10" to be referred by the instruction history table 22. The instruction history table 22 refers the entry number "10" outputted from the hash function circuit 21 and also refers the execution instruction and the speculative execution flag, and the instruction history table 22 writes the logical "1" which indicates that the load instruction has been executed as the content of the entry "10".

In the third cycle 3, the load instruction "LD3" is subjected to the data dependence speculative execution. The hash function circuit 21 takes the second and third bits of the address "A3=00001100" for the load instruction "LD3" and outputs the entry number "11" to be referred by the instruction history table 22. The instruction history table 22 refers the entry number "11" outputted from the hash function circuit 21 and also refers the execution instruction and the speculative execution flag, and the instruction history table 22 writes the logical "1" which indicates that the load instruction has been executed as the content of the entry "11".

In the fourth cycle 4, the load instruction "LD4" is subjected to the data dependence speculative execution. The hash function circuit 21 takes the second and third bits of the address "A4=00010000" for the load instruction "LD4" and outputs the entry number "00" to be referred by the instruction history table 22. The instruction history table 22 refers the entry number "00" outputted from the hash function circuit 21 and also refers the execution instruction and the speculative execution flag, and the instruction history table 22 writes the logical "1" which indicates that the load instruction has been executed as the content of the entry "00".

In the fifth cycle 5, the store instruction "ST1" is subjected to the data dependence speculative execution. The hash function circuit 21 takes the second and third bits of the address "A4=00010000" for the store instruction "ST1" and outputs the entry number "00" to be referred by the instruction history table 22. The instruction history table 22 refers the entry number "00" outputted from the hash function circuit 21 and also refers the execution instruction and the speculative execution flag, and the instruction history table 22 read out the logical "1" which indicates that the load instruction has been executed from the entry "00", whereby the read after write dependence from the store instruction ST1 to the load instruction LD1 or LD4.

Since the processor is in the data dependence speculative execution state, the data dependence detector 20 takes the logical "1" for the data dependence detected result 26 to notify the processor control unit 17 of the failure of the data dependence speculative execution.

Upon receipt of the notice of the failure of the data dependence speculative execution, the processor control unit 17 performs the necessary recovery process for the failure of the data dependence speculative execution, from the subsequent sixth cycle 6. Due to the failure of the data dependence speculative execution, the speculative execution flag returns to the logical "0". The instruction history table 22 re-sets the contents of all the entries at the logical "0" for the next data dependence speculative execution.

The example of the operation by the data dependence detector against the failure of the data dependence speculative execution has been described above. If the data dependence speculative execution has been succeeded, then no recovery process is executed and subsequent instructions are continuously executed.

With reference again to FIG. 6C, even the address "A1=00100000" of the load instruction "LD1" is different from the address "A4=00010000" of the load instruction "LD4", then the same entry "00" on the instruction history table 22 is referred, wherein the "areas" appears, because the bash function circuit 21 converts the address "A1=0010000" and the address "A4=00010000" into the same entry number "00". Even if the load instruction "LD4" was executed after the store instruction "ST1" and the read after write dependence was not detected, then a pseudo read after write dependence is detected from the store instruction "ST1" to the load instruction "LD1". Thus, even the data dependence speculative execution has been succeeded, the data dependence detector incorrectly judges the data dependence speculative execution to be the failure. The unnecessary recovery process is thus executed, but this recovery process does not change the meaning of the program, for which reason the correctness of the executed result of the program is ensured even the areas appear.

The execution of the unnecessary recovery process reduces the executive performance of the program. It is, however, possible to reduce the probability of generation of the areas by appropriate selection of the hash function of the hash function circuit 21 and by a sufficiently large number of the entries on the instruction history table 22. A sufficiently small probability of generation of the areas allows a substantive improvement of the executive performance of the program due to the effect of the data dependence speculative execution.

For example, if the number of the entries on the instruction history table 22 increases from 4 to 8, and if the hash function circuit 21 takes the second, third and fourth bits of the address, then the address "A1=00100000" is allocated to the entry "000", the address "A2=00101000" is allocated to the entry "010", the address "A3=00001100" is allocated to the entry "011", the address "A4=0001000" is allocated to the entry "100", for which reason the areas do not appear.

If the number of the entries of the instruction history table 22 is unchanged at 4, and if the hash function circuit 21 takes a first exclusive-OR of the second and fourth bits of the address for 0-bit digit and also takes a second exclusive-OR of the third and fifth bits of the address for 1-bit digit, then the address "A1=00100000" is allocated to the entry "10", the address "A2=00101000" is allocated to the entry "00", the address "A3=00001100" is allocated to the entry "11", the address "A4=00010000" is allocated to the entry "01", for which reason the areas do not appear.

Accordingly, it is possible to reduce the probability of generation of the areas by appropriate selection of the hash function of the hash function circuit 21 and by a sufficiently large number of the entries on the instruction history table 22.

The data dependence detector provides an effect that the necessary hardware size for judging the success or the failure of the data dependence speculative execution is small. The number of the load instructions which may be subjected to the data dependence speculative execution is not limited by the hardware size of the data dependence detector. The small hardware size allows the improvement in executive performance of the data dependence speculative execution.

The addresses of the load instructions are allocated by the hash function circuit 21 into a specific entry of the instruction history table 22 with overlap, for which reason it is unnecessary to store all of the addresses of the executed load instructions and also to provide any address comparator for comparing those addresses to the addresses of the store instructions.

The data dependence detector also provides another effect that it is unnecessary to compare the address of the store instruction and the address of the load instruction in the detection process for the read after write dependence in the execution of the store instruction.

Further, only one entry is to be read out from the instruction history table, for which reason it is unnecessary to operate the logical-OR. The necessary time for detecting the read after write dependence is short and it is easy to obtain desirable high speed and high frequency, performances of the processor.

In accordance with the above-described first embodiment, if the load instruction has been executed, the address of the load instruction is converted by the hash function circuit 11 into the entry number of the instruction history table 12. The value indicating that the load instruction has been executed is stored into the entry of the instruction history table 12, which is indicated by the entry number as converted. If the store instruction has been executed, the address of the store instruction is converted by the hash function circuit 11 into the entry number of the instruction history table 12. The value indicating that the store instruction has been executed is read out from the entry of the instruction history table 12, which is indicated by the entry number as converted. As a result, the possibility of the presence of the read after write dependence is detected. The above described structure may also be applicable to detect the possibility of a write after read dependence or the possibility of an write after write dependence.

For example, if the store instruction has been executed, the address of the store instruction is converted by the hash function circuit 11 into the entry number of the instruction history table 12. The value indicating that the store instruction has been executed is stored into the entry of the instruction history table 12, which is indicated by the entry number as converted. If the load instruction has been executed, the address of the load instruction is converted by the hash function circuit 11 into the entry number of the instruction history table 12. The value indicating that the load instruction has been executed is read out from the entry of the instruction history table 12, which is indicated by the entry number as converted. As a result, the possibility of the presence of the write after read dependence is detected.

For example, if the store instruction has been executed, the address of the store instruction is converted by the hash function circuit 11 into the entry number of the instruction history table 12. The value indicating that the store instruction has been executed is read out from the entry of the instruction history table 12, which is indicated by the entry number as converted. In addition, the value indicating that the Store instruction has been executed is stored into the entry of the instruction history table 12, which is indicated by the entry number as converted. As a result, the possibility of the presence of the write after write dependence between the store instructions is detected.

For example, if the load instruction has been executed, the address of the load instruction is converted by the hash function circuit 11 into the entry number of the instruction history table 12. The value indicating that the load instruction has been executed is read out from the entry of the instruction history table 12, which is indicated by the entry number as converted. In addition, the value indicating that the load instruction has been executed is stored into the entry of the instruction history table 12, which is indicated by the entry number as converted. If the store instruction has been executed, the address of the store instruction is converted by the hash function circuit 11 into the entry number of the instruction history table 12. The value indicating that the store instruction has been executed is read out from the entry of the instruction history table 12, which is indicated by the entry number as converted. In addition, the value indicating that the store instruction has been executed is stored into the entry of the instruction history table 12, which is indicated by the entry number as converted. As a result, the possibility of the presence of the read after write dependence, the possibility of the presence of the write after read dependence and the possibility of the presence of the write after write dependence between the store instructions are detected.

For the data dependence speculative execution, the data dependence detector does not strictly detect the presence of the read after write dependence from the store instruction to the load instruction, but does detect the possibility of the presence of the read after write dependence from the store instruction to the load instruction. The address of the load instruction is allocated by the hash function circuit with duplication or overlap to the entry designated on the instruction history table. It is unnecessary to store all of the addresses of the load instructions as executed and also unnecessary to provide an address comparator for comparison to the address of the store instruction. The data dependence detector provides an effect that the necessary hardware size for judging the success or the failure of the data dependence speculative execution is small. The number of the load instruction which may be subjected to the data dependence speculative execution is not limited by the hardware size of the data dependence detector, for which reason a small hardware size may improve the performances in the data dependence speculative execution. The data dependence detector also provides another effect that it is unnecessary to compare the address of the store instruction and the address of the load instruction in the detection process for the read after write dependence in the execution of the store instruction. Further, only one entry is to be read out from the instruction history table, for which reason it is unnecessary to operate the logical-OR. The necessary time for detecting the read after write dependence is short and it is easy to obtain desirable high speed and high frequency performances of the processor.

Second Embodiment

A second embodiment according to the present invention will be described in detail with reference to the drawings. Another data dependence detector is provided in this embodiment. The data dependence detector realizes the data dependence speculative execution in a thread parallel processing in a multiple processor system. The thread parallel processing is that a single program or plural programs are divided into plural program units so called to as "threads", so that the threads are subjected to the parallel processings by the plural processors for obtaining a high speed processings of the programs.

The thread is the unit of the program. The thread comprises a queue of plural instructions. A sequence among the plural threads is defined. For example, two threads "T0" and "T1" belong to the same program. She sequence relation is defined between the two threads "T0" and "T1". If the thread "T0" is prior to the thread "T1", then this means on the program that the thread "T0" should be executed prior to the thread "T1". If the thread "T1" is prior to the thread "T0", then this means on the program that the thread "T1" should be executed prior to the thread "T0". If no dependence is present between the two threads "T0" and "T1", then the executions of the two threads "T0" and "T1" without considering the sequence relation between the m does not change the program meanings, and the correct result of execution of the program can be obtained.

In the thread parallel processings, the threads are executed in parallel to each other independently from the sequence relation between them for obtaining high speed execution of the program. The non-program-sequence execution in instruction threads is in comparison to the non-program-sequence execution in instruction units.

The non-program-sequence execution in instruction threads needs to ensure and cancel the dependence between instructions included in the thread for obtaining the corrective result of the program.

Similarly to the non-program-sequence execution in instruction units, it is necessary to do the execution in the program sequence particularly for the read after write dependence relating to a memory. The execution definitively in the program sequence do not obtain the effect of the improvement in execution of the non-program-sequence execution.

Particularly, this is more serious problem for the non-program-sequence execution in the thread unit because the thread units, each of which comprises plural instructions, prevent the non-program-sequence execution.

For countermeasure to the above problem, it is effective to do the data dependence speculative execution. The presence or absence of the read after write dependence between the instructions included in the thread is not confirmed. In place, it is assumed that no read after write dependence is present and the non-program-sequence execution in the thread units are speculatively executed. Namely, the data dependence speculative execution in the thread units is implemented.

For realizing the data dependence speculative execution in the thread units, it is necessary to detect the read after write dependence from the store instruction included in the prior thread to the load instruction included in the later thread.

The data dependence detector of this second embodiment has a function to detect the read after write dependence from the store instruction included in the prior thread to the load instruction included in the later thread. The data dependence detector performs the non-program-sequence execution in the thread units, but assumes that the non-program-sequence execution is not made between instructions included in the same thread. The data dependence detector docs not detect the read after write dependence between instructions included in the same thread.

Figure 7B:
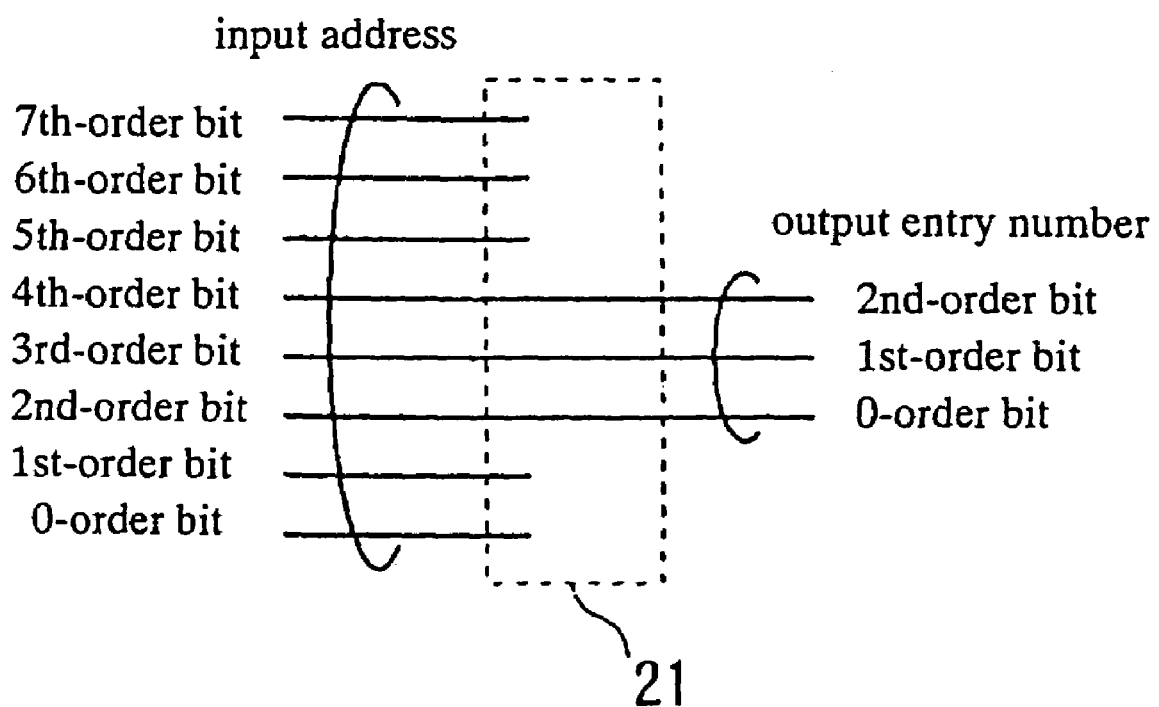
FIG. 7B is a diagram illustrative of a first example of the hash function circuit in the second embodiment in accordance with the present invention.
Figure 8:
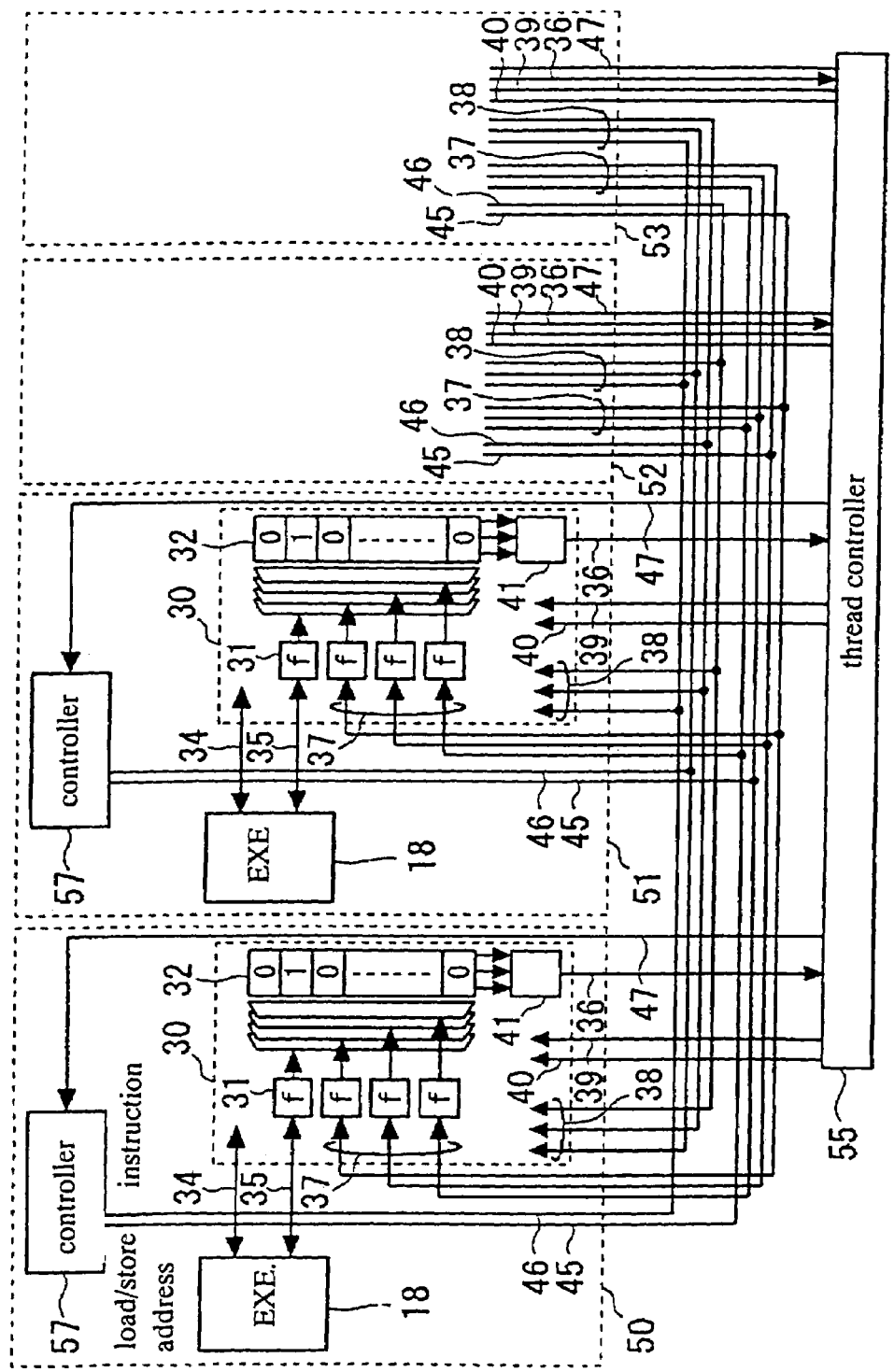
FIG. 8 is a diagram illustrative of a structure of a multiple processor system including a data dependence detector in a second embodiment in accordance with the present invention.

FIG. 8 is a diagram illustrative of a structure of a multiple processor system including a data dependence detector in a second embodiment in accordance with the present invention. FIG. 7B is a diagram illustrative of a first example of the hash function circuit in the second embodiment in accordance with the present invention. The system includes four processors 50, 51, 52 and 53, and a thread control unit 55. The processors 50, 51, 52 and 53 have the same structure. The illustration of the internal structures of the processors 52 and 53 are omitted.

The thread control unit 55 allocates threads to the processors 50, 51, 52 and 53, so that the processors 50, 51, 52 and 53 execute the respectively allocated threads. The thread control unit 55 also notifies the processors 50, 51, 52 and 53 of the sequence relations between the threads. The thread control unit 55 also instructs the processors 50, 51, 52 and 53 to perform the recovery process for the failures of the data dependence speculative execution in the thread units. The thread control unit 55 also performs the thread parallel processings and controls the data dependence speculative execution. Each of the processors 50, 51, 52 and 53 includes a data dependence detector 30, a processor control unit 57 and an instruction execution unit 18. Other elements for the processor are not illustrated.

The thread control unit 55 allocates the threads to the processors 50, 51, 52 and 53 for the thread parallel processings of the program by the processors 50, 51, 52 and 53. The thread control unit 55 also supplies the processors 50, 51, 52 and 53 with the speculative execution flag indicating whether or not the thread is executed in the data dependence speculative execution and also with the thread sequences which indicate the sequence relations to the other threads to be executed by the other three processors.

Each of the processors 50, 51, 52 and 53 has input ports for speculative execution flags 39 and for thread sequences 40. When the processor executes the thread allocated by the thread control unit 55, the processor control unit 57 supplies the kind of the instruction, which is to be executed, to the instruction execution unit 18 and the data dependence detector 30 as well as to the other three processors through execution instructions 46.

The data dependence detector 30 receives the input of the kind of the instruction to be executed from an input port of an execution instruction 34. Concurrently, the data dependence detector 30 also receives the inputs of the kinds of the instructions to be executed by the other three processor from input ports of execution instructions 38. If the instruction to be executed is the load or store instruction, the processor control unit 57 supplies the instruction execution unit 18 and the data dependence detector 30 with the address of the load instruction or the store instruction as wall as sends the address of the load instruction or the store instruction through a load/store instruction 45 to the other three processors. The data dependence detector 30 receives an input of the address of the load instruction or the store instruction from a load/store instruction 35. If the instructions to be executed by the other three processors is the load instruction or the store instruction, then the data dependence detector 30 receives inputs of the addresses of the load instruction or the store instruction from load/store addresses 37.

If the processor 50 executes the thread allocated by the thread control unit 55, then the processor control unit 57 of the processor 50 supplies the kind of the instruction to be executed to the instruction execution unit 18 and the data dependence detector 30 as well as to the execution instruction 46 which is then transmitted to the other three processors 51, 52 and 53. Concurrently, the data dependence detector 30 receives, from the execution instructions 38, the kinds of the instructions to be executed by the other three processors 51, 52 and 53.

If the instruction to be executed is the load instruction or the store instruction, the processor control unit 57 of the processor 50 supplies the address of the instruction to the instruction execution unit 18 and the data dependence detector 30 of the processor 50 as well as to the load/store addresses 45 which are then transmitted to the other three processors 51, 52 and 53. Concurrently, if the instructions to be executed by the other three processors 51, 52 and 53 are the load instructions or the store instructions, then the data dependence detector 30 of the processor 50 receives the input of the addresses of the instructions from the load/store addresses 37.

The data dependence detector 30 of each of the processors 50-53 includes the hash function circuit 31, the instruction history table 32 and a logic-OR circuit 41. The processor in which the circuitry such as the data dependence detector 30, the processor control unit 57 and the instruction execution unit 18 are provided, will hereinafter be referred to as self-processor.

The data dependence detector 30 receives the inputs of the execution instruction 34 and the load/store instruction 35 from the processor control unit 57 in the self-processor as well as receives the inputs of the execution instructions 38 and the load/store addresses 37 from the other three processors. The data dependence detector 30 also has input ports of the speculative execution flag 39 and the thread sequence 40 from the thread control unit 55. The data dependence detector 30 also has an Output port of the data dependence detected result 36 which is supplied to the thread control unit 55.

Each of the processors 50-53 has four hash function circuits 31, each of which comprises a logic circuit realizing a hash function "f" which converts the address of the load instruction or the store instruction into the entry number of the instruction history table 32. The hash function "f" takes the same value for the sane input. If N1=f(A1) and N2=f(A2), then A1=A2 cases N1=N2. One of the four hash function circuits 31 converts the address of the load instruction to be executed by the self-processor into the entry number of the instruction history table 32. Each of the remaining three hash functions "f" converts the address of the store instruction to be executed by respective one of the other three processors into the entry number of the instruction history table 32.

The instruction history table 32 comprises a plurality of entry which stores one-bit information. If the output from the hash function circuit 31 has an n-bit width, then a total number of the entries is equal to the n-power of 2. The instruction history table 32 has a single write port and three read ports for performing a single write operation and three read operations concurrently.

One of the four hash function circuits 31 has the input port of the address of the load instruction to be executed by the self-processor. This hash function Circuit 31 has an output port which is connected to the write port of the instruction history table 32 for write operation to the entry designated by the entry number supplied from the hash function circuit 31. The remaining three hash function circuits 31 having the input ports of the addresses of the store instructions to be executed by the processors have an output port which is connected to the read port of the instruction history table 32.

The instruction history table 12 is capable of initializing all of the entries upon receipt of the input of the speculative execution flag 39 from the thread control unit 55, wherein the same number is written into all of the entries.

A logic-OR function 41 operates a logic-OR of the three read out results from the three read ports of the instruction history table 32, and this operated result is supplied to the data dependence detected result 36 which is transmitted to the thread control unit 55.

Operations of the data dependence detector 30 will be described with reference to FIG. 8. In an initial state, all of the entries of the instruction history table 32 are in the first state, for example, logic "0" which indicates that the load instruction has not been executed by the self-processor. If the self-processor does not perform the speculative instruction execution to the data dependence and does perform the instruction execution in the order defined by the program (hereinafter referred to as "definitive execution state", then the data dependence detector 30 does not perform any operation.

If the self-processor does perform the speculative instruction execution to the data dependence and does not perform the instruction execution in the order defined by: the program, then the data dependence detector 30 does perform a detecting process for a read after write dependence from the store instruction to the load instruction, wherein the store instruction is to be executed by the processor allocated with a prior thread which is prior in program sequence to the thread to be executed by the self-processor, whilst the load instruction is to he executed by the self-processor.

The speculative execution flag 39 supplied from the thread control unit 55 and inputted into the data dependence detector 30 indicates whether the self-processor is in the definitive execution state or the speculative execution state.

Whether the thread to be executed by the self-processor is prior in program sequence to the threads to be executed by the other three processors is judged by the thread sequence 40 which is supplied from the thread control unit 55 and inputted into the data dependence detector 30. The kinds of the instructions on executions by the other three processors are judged by the execution instructions 38 supplied from the other three processors into the data dependence detector 30.

If the self-processor is in the speculative execution state, after the self-processor performs the speculative execution of the load instruction, then the data dependence detector 30 stores that the load instruction has been speculatively executed to the instruction history table 32. In more detail, the address of the load instruction is converted by the hash function circuit 31 into the entry number of the instruction history table 32 for input into the write port of the instruction history table 32. The instruction history table 32 converts a corresponding entry to the inputted entry number into a second state, for example, a logical value "1" which indicates that the load instruction has speculatively been executed.

If the self-processor is in the speculative execution state and if the store instruction is executed by the processor which is allocated with the prior thread which is prior in program sequence to the thread to be executed by the self-processor, then the data dependence detector 30 read out the state from the corresponding entry of the instruction history table 32. In more detail, the address of the store instruction is converted by the hash function circuit 31 into the entry number of the instruction history table 32 for input into the corresponding one of the three input ports of the instruction history table 32. The instruction history table 32 reads out the content of the entry designated by the entry number inputted and supplies the -content to the logic-OR circuit 41. The logic-OR circuit 41 operates the logic-OR of the outputs from the three red ports of the instruction history table 32 and supplies the operated result to the data dependence, detected result 36 which is transmitted to the thread control unit 55.

If the address of the store instruction as executed by the processor allocated with the prior thread to the thread executed by the self-processor is either equal to the address of the load instruction subjected to the data dependence speculative execution by the self-processor or allocated to the same entry of the instruction history table 32 due to appearance of the areas, then the value indicating, that the load instruction subjected to the data dependence speculative execution is present, is read out from the instruction history table 327 the possibility of the presence of the read after write dependence is detected. In this case, the data dependence detector 30 supplies the value indicating the failure of the data dependence speculative execution, for example, logical "1" onto the data dependence detected result 36 which is then transmitted to the thread control unit 55.

The thread control unit 55 receives the notice of the failure of the data dependence speculative execution from either the processors 50-53, and the thread control unit 55 sends a request for recovery process against the failure of the data dependence speculative execution to the processor which has supplied the above notice of the failure of the data dependence speculative execution as well as to the processors executing the thread post in program sequence to the thread executed by the processor which has supplied the above notice. The processors have received the request for the recovery process to the failure of the data dependence speculative execution, wherein the processor control unit 57 receives the notice of the request for the recovery process from the recovery execution request 47.

The reason why the request for the recovery process to the failure of the data dependence speculative execution is sent to not only the processor which has supplied the above notice of the failure of the data dependence speculative execution but also the processors executing the thread post in program sequence to the thread executed by the processor which has supplied the above notice would be as follows. It is possible that the processor which has notified the failure of the data dependence speculative execution has subjected the load instruction to the data dependence speculative execution in violation to the read after write dependence. It is possible that the executed result of the thread with the failure of the data dependence speculative execution is not correct. It is thus possible that the executed result of the thread post in program sequence to the thread with the failure of the data dependence speculative execution is also not correct. It is further possible that the executed result of the thread post in program sequence to the thread which is further post in program sequence to the thread with the failure of the data dependence speculative execution is also not correct. Consequently, it is, therefore, possible that the executed results of any threads, which are post in program sequence to the thread with the failure of the data dependence speculative execution would be not correct. For those reasons, the request for the recovery process to the failure of the data dependence speculative execution is sent to not only the processor which has supplied the above notice of the failure of the data dependence speculative execution but also the processors executing the thread post in program sequence to the thread executed by the processor which has supplied the above notice, in order to ensure the correctness of the executed result of the threads.

In the processor having received the request for the recovery process against the failure of the data dependence speculative execution from the thread control unit 55, the processor control unit 57 is notified of the request for the recovery process against the failure of the data dependence speculative execution from the recovery process execution request 47. In this cause, each of the processors 50-53 performs the necessary recovery process to ensure the correctness of the executed result of the threads.

The data dependence detector 30 has a function to detect the read after write dependence from the store instruction included in the thread prior in program sequence to the thread executed by the self-processor to the load instruction included in the thread executed by the self-processor. This function is realized by that the instruction history table 32 of the data dependence detector 30 has the write port for writing operation for the data dependence speculative execution of the load instruction by the self-processor and also has the plural read ports for read out operations for the executions of the store instructions by the other processors. The function enables the data dependence speculative execution in thread units in the thread parallel processings for improving the high speed processing.

The data dependence detector performs the non-program-sequence execution in the thread units, but assumes that the non-program-sequence execution is not made between instructions included in the same thread. The data dependence detector does not detect the read after write dependence between instructions included in the same thread.

The data dependence detector 30 does not strictly detect the presence of the read after write dependence from the store instruction to the load instruction, but does detect the possibility of the presence of the read after write dependence from the store instruction to the load instruction. The address of the load instruction is allocated by the hash function circuit 31 with duplication or overlap to the entry designated on the instruction history table. It is unnecessary to store all of the addresses of the load instructions as executed and also unnecessary to provide an address comparator for comparison to the address of the store instruction. The data dependence detector provides an effect that the necessary hardware size for judging the success or the failure of the data dependence speculative execution is small.

The number of the load instruction which may be subjected to the data dependence speculative execution is Dot limited by the hardware size of the data dependence detector, for which reason a small hardware size may improve the performances in the data dependence speculative execution. Particularly, the data dependence speculative execution in the thread units is likely to have a large number of the load/store instructions. The above effect free of the hardware size is more effective to the data dependence speculative execution in the thread units.

Figure 9:
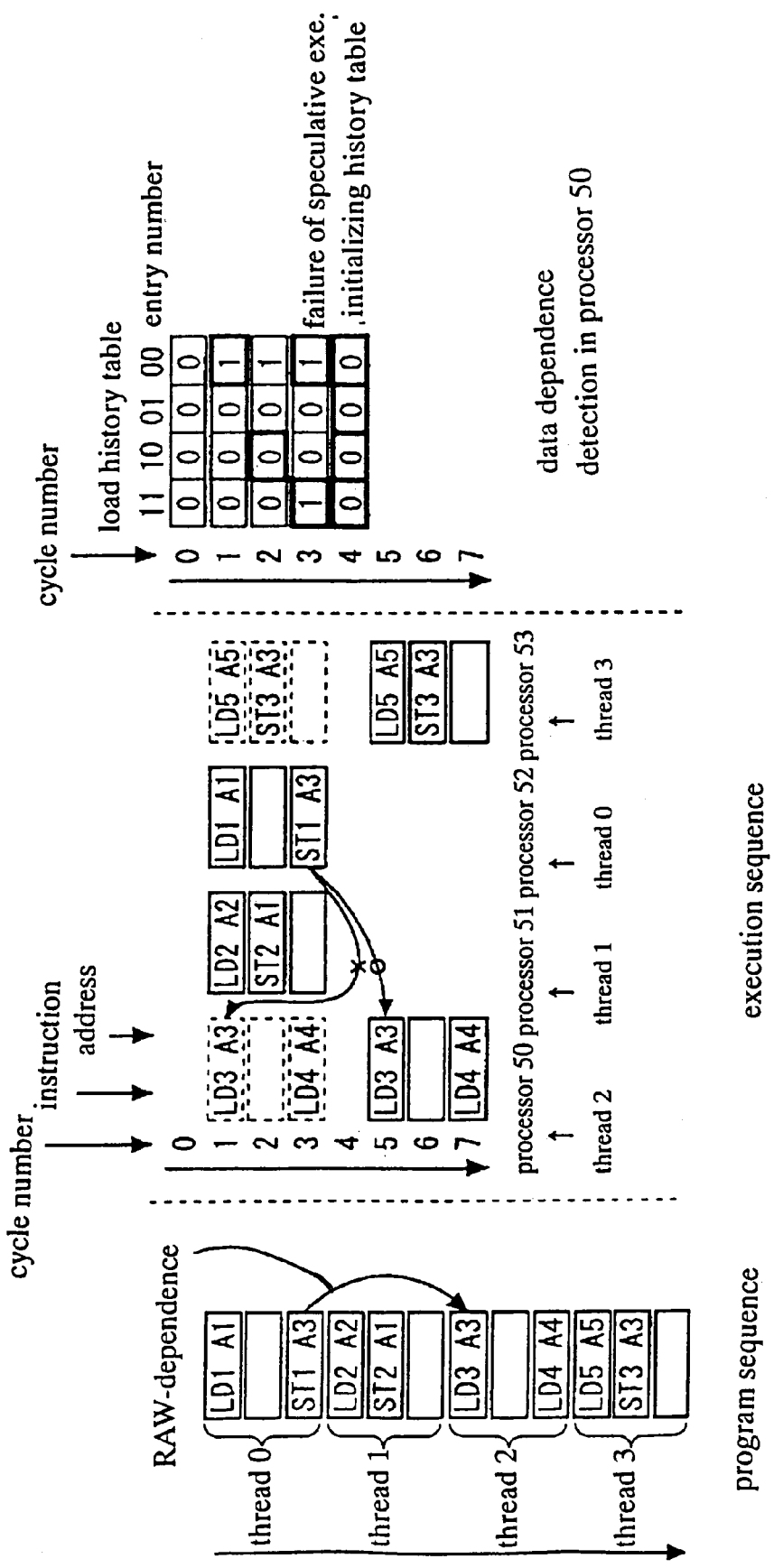
FIG. 9A is a diagram illustrative of a program sequence of instruction.
FIG. 9B is a diagram illustrative of the instruction execution sequences of the data dependence speculative execution in the thread parallel execution.
FIG. 9C is a diagram illustrative of the data dependence detection operation by the data dependence detector in the processor in the instruction execution sequence shown in FIG. 9B.

The data dependence speculative execution in the thread parallel processings will be described in more detail with reference to. FIGS. 8, 9A, 9B and 9C. FIG. 9A is a diagram illustrative of a program sequence of instruction. The program includes twelve instructions which are grouped into four threads, each of which includes three instructions. The twelve instructions include load instructions "LD1", "LD2", "LD3", "LD4", and "LD5", and store instructions "ST1", "ST2", and "ST3", and other instructions Marked with blackbox.

The program sequence is that the load instruction "LD1" at an address "A1", the other instruction, the store instruction "ST1" at an address "A3", the load instruction "LD2" at an address "A2", the store instruction "ST2" at an address "A1", the other instruction, the load instruction "LD3" at an address "A3", the other instruction, the load instruction "LD4" at an address "A4", the load instruction "LD5" at an address "A5", the store instruction "ST3" at an address "A3", and the other instruction.

The programs are divided into four threads "0", "1", "2" and "3" which are to be executed by the four processors 50-53 in parallel. Each of the threads "0", "1", "2" and "3" includes three instructions. The thread "0" includes the load instruction "LD1" at the address "A1", the other instruction, and the store instruction "ST1" at the address "A3". The thread "1" includes the load instruction "LD2" at the address "A2", the store instruction "ST2" at the address "A1" and the other instruction. The thread "2" includes the load instruction "LD3" at the address "A3", the other instruction, the load instruction "LD4" at the address "A4". The thread "3" includes the load instruction "LD5" at the address "A5", the store instruction "ST3" at the address "A3", and the other instruction. The thread "0" is executed by the processor 52. The thread "1" is executed by the processor 51. The thread "2" is executed by the processor 50. The thread "3" is executed by the processor 53.

The load instruction "LD3" and the store instruction "ST1" have the same address "A3". The store instruction "ST1" is prior in program sequence to the load instruction "LD3. There is a data dependence from the store instruction "ST1" to the load instruction "LD3. The store instruction "ST1" is executed prior to the load instruction "LD3. The content is stored at the address "A3" by the store instruction "ST1", before the content is then red out from the address "A3" by the load instruction "LD3" in order to ensure the correctness of the executed result of the program. In the parallel processings in the thread units, the read after write dependence is present from the thread "0" including the store instruction "ST1" to the thread "2" including the load instruction "LD3". At the time when the threads are allocated to the processors, the read after write dependence from the store instruction "ST1" to the load instruction "LD3" or the read after write dependence from the thread "0" to the thread "2" has not yet been known. For those reasons, for the definitive thread parallel processings, it is necessary that the threads, which have been not confirmed of no presence of the read after write dependence, are sequentially executed to ensure the read after write dependence. It is difficult to obtain the advantages in high speed processings in the thread parallel processings.

In accordance with the data dependence speculative execution in the thread units, the threads are speculatively executed in parallel even the presence of the read after write dependence between the threads is unknown. If the probability of the success of the data dependence speculative execution is sufficiently high, then the advantages in high speed processings of the program by the thread parallel processings can be obtained.

FIG. 9B is a diagram illustrative of the instruction execution sequences of the data dependence speculative execution in the thread parallel execution. Cycle numbers, the execution instructions in the corresponding cycle by the processor 50 which executes the thread "2", the address of the execution instruction, the execution instructions: in the corresponding cycle by the processor 51 which executes the thread "1", the address of the execution instruction, the execution instructions in the corresponding cycle by the processor 52 which executes the thread "0", the address of the execution instruction, the execution instructions in tile corresponding cycle by the processor 53 which executes the thread "3", and the address of the execution instruction.

The processor 50 executes the thread "2", wherein the processor 50 executes the load instruction "LD3" at the address "A3" in cycle 1, the other instruction in cycle 2, the load instruction "LD4" at the address "A4" in cycle 3. The processor 51 executes the thread "1", wherein the processor 51 executes the load instruction "LD2" at the address. "A2" in cycle 1, the store instruction "ST2" at the address "A1" in cycle 2 and the other instruction in cycle 3. The processor 52 executes the thread "0", wherein the processor 52 executes the load instruction "LD1" at the address "A1" in cycle 1, the other instruction in cycle 2, and the store instruction "ST1" at the address "A3" in cycle 3. The processor 53 executes the thread "3", wherein the processor 53 executes the load instruction "LD5" at the address "A5" in cycle 1, the store instruction "ST3" at the address "A3" in cycle 2, and the other instruction in cycle 3.

The thread "0" is the most prior thread in the program sequence. There is no read after write dependence from the store instruction included in the threads "1", "2" and "3" to the load instruction included in the thread "0". The processor 52 executes the thread "0" definitively. The issues of the presence of the read after write dependence for the thread "1", "2" and "3" are unknown. The processors 50, 51 and 53 execute the threads "1", "2" and "3" speculatively or in the data dependence speculative execution. As shown in FIG. 913, even if the data dependence speculative execution is succeeded, then the program comprising the twelve instructions are executed only in three cycles. A remarkable improvement of the program execution speed can be obtained.

In case shown in FIG. 9B, if the load instruction "LD3" is executed by the processor 50 in cycle 1, and the store instruction "ST1" is executed by the processor 52 in cycle 3 even the read after write dependence is not ensured from the store instruction "ST1" to the load instruction "LD3". The correctly executed result can not be obtained. The data dependence speculative execution of the thread "2" by the processor 50 becomes failure. The data dependence detector 30 in the processor 50 detects the read after write dependence from the store instruction "ST1" executed by the processor 52 to the load instruction "LD3" executed by the processor 50. The data dependence detector 30 also notifies the thread control unit 55 of the failure of the data dependence speculative execution of the thread 2. The thread control unit 55 receives the notice of the failure of the data dependence speculative execution of the thread 2 and then sends the request for the necessary recovery processes to the processor 50 and also to the processor 53 which executes the thread "3" post in program sequence to the thread "2" which data dependence speculative execution become failure.

FIG. 9C is a diagram illustrative of the data dependence detection operation by the data dependence detector in the processor 50 in the instruction execution sequence shown in FIG. 9B. Cycle numbers and states of the instruction history table 32 in respective cycles are shown. The instruction history table 32 comprises four entries "00", "01", "10" and "11".

In cycle "0", the instruction history table 32 is in the initial state, wherein the contents of the all entries are logical "0" which indicates that the load instruction has not been executed. In cycle "1", the processor 50 performs the data dependence speculative execution of the load instruction "LD3" included in the thread "2". The address "A3" of the load instruction "LD3" is converted by the hash function circuit 31 into the entry number "00" of the instruction history table 32, the content of the entry "00" of the instruction history table 32 becomes logical "1" which indicates that the load instruction has been executed.

In cycle "2", the processor 51 executes the store instruction "ST2" included in the thread "1" and the processor 53 executes the store instruction "ST3" included in the thread "3". The thread "1" executed by the processor 51 is prior in program sequence to the thread "2" subjected to the data dependence speculative execution by the processor 50. The thread "1" is the subject to the read after write dependence detection. The data dependence detector 30 receives the kinds of the instructions executed by the other processors from the execution instructions 38 and also receives the addresses of the execution instructions from the load/store addresses 37. The address "A2" of the store instruction "ST2" is converted by the hash function circuit 31 into the entry number "10" of the instruction history table 32, the data dependence detector 30 reads out the content of the entry "10" of the instruction history table 32 for detecting the read after write dependence from the store instruction "ST2 to the load instruction executed by the self-processor. In this case, the logical "0" indicating that the load instruction has not been executed is read out from the entry number "10" of the instruction history table 32, for which reason the data dependence speculative execution of the thread "2" by the processor 50 is succeeded to the thread "1" executed by the processor 1.

The thread "3" executed by the processor 53 is post in program sequence to the thread "2" subjected to the data dependence speculative execution by the processor 50. The thread "3" is not the subject to the read after write dependence detection. The address "A3" of the store instruction "ST3" included in the thread "3" is the same as the address of the load instruction "LD3" executed by the processor 50 in cycle "1". The load instruction "LD3" is prior in program sequence to the store instruction "ST3". The read after write dependence is always not present. The instruction history table 32 in the processor 50 does not judge the success or the failure of the data dependence speculative execution to the store instruction included in the thread "3" executed by the processor 53. The instruction history table 32 in the processor 50 judges that the data dependence speculative execution has been succeeded in cycle 2 and subsequently continues the thread executions.

In cycle "3", the processor 50 executes the load instruction "LD4" included in the thread "2" and the processor 52 executes the store instruction "ST1" included in the thread "0". The address "A4" of the load instruction "LD4" is converted by the hash function circuit 31 into the entry number "11" of the instruction history table 32, the instruction history table 32 makes the content of the entry "1" on the instruction history table 32 into the logical "1" indicating that the load instruction has been executed. The thread "0" executed by the processor 52 is prior in program sequence to the thread "2" subjected to the data dependence speculative execution by the processor 50. The thread "0" is subjected to the read after write dependence detection. The presence of the read after write dependence from the store instruction "ST1" executed by the processor 52 into the load instruction executed by the self-processor 50 is detected. The address "A3" of the store instruction "ST1" is converted by the hash function circuit 31 to the entry number "00" of the instruction history table 32. The data dependence detector 30 reads out the content of the entry "00" on the instruction history table 32 and judges the presence of the read after write dependence from the store instruction "ST1" into the load instruction executed by the self-processor 50. In this case, the logical "1" stored in tie cycle "0" by the load instruction "LD3" is read out from the entry "00" of the instruction history table 32. Namely, the read after write dependence from the store instruction "ST1" into the load instruction "LD3" is detected. For this reason, the data dependence speculative execution of the thread "2" by the processor 50 is judged to be the failure, and the notice of the failure of the data dependence speculative execution is notified through the data dependence detected result 36 to the thread control unit 55.

The thread control unit 55 receives the notice of the failure of the data dependence speculative execution from either the processor 50, and the thread control unit 55 sends a request for recovery process against the failure of the data dependence speculative execution to the processor which has supplied the above notice of the failure of the data dependence speculative execution to the processor 50 and the processor 53 executing the thread "3" which is post in program sequence to the thread "2" subjected to the data dependence speculative execution.

The detection of the read after write dependence by the data dependence detector 30 in the data dependence speculative execution as well as the judgement of the success and the failure of the data dependence speculative execution have been described with reference to the processor 50. In each of the processor 51 executing the thread "1", the processor 52 executing the thread "0", and processor 53 executing the thread "3", the data dependence detector 30 detects the read after write dependence and judge the success and the failure of the data dependence speculative execution. For the processors 51 and 52, the read after write dependence is not detected and the success of the data dependence speculative execution is judged. For this reason, the executions have been completed in cycle 3. For the processor 53, the read after write dependence is not detected and the success of the data dependence speculative execution is judged. However, the processor 50 has the failure of the data dependence speculative execution to the thread "2" which is prior in program sequence to the thread "3" executed by the processor 53, the recovery process for the failure of the data dependence speculative execution is requested.

The processors 50 and 53 are requested for the recovery process for the failure of the data dependence speculative execution. In the processors 50 and 53, the processor control unit 57 receives the request from the recovery process request 47 and cancels the executed results of the thread up to the cycle 3 and subsequently starts the re-execution of the thread in the cycle 5. The threads "0" and "1" have been executed completely. The thread "2" is the most prior thread in the unexecuted threads "2" and "3". The thread "2" is definitively executed. The processor 50 executes the load instruction "LD3" in cycle 5, the other instruction in cycle 6, and the load instruction "LD4" in cycle 7 definitively. The read after write dependence is present from the store instruction "ST1" included in the thread "0" to the load instruction "LD3" executed in cycle 5. The store instruction "ST1" has been executed by the processor 52 in cycle 3. This is no violation to the read after write dependence. The read after write dependence from the thread 2 to the thread 3, namely the read after write dependence from the store instruction included in the thread 2 to the load instruction included in the thread 3 is unknown. The data dependence speculative execution is performed again. The processor 53 speculatively executes the load instruction "LD5" in cycle 5, the store instruction "ST3" in cycle 6 and other instruction in cycle 7. In this case, the read after write dependence is not detected from the thread 2. The data dependence speculative execution is judged to be the success. The execution of the thread 3 has been completed in cycle 7.

The operations of the data dependence speculative execution has been described above. The program including the twelve instructions are executed by the four processors in the thread parallel processings. If the data dependence speculative execution was succeeded, then the execution of the program has been completed in three cycles. If the data dependence speculative execution has one failure, then the execution of the program has been completed in seven cycles.

The above description has been made, assuming that each thread includes only three instructions. Actually, however, the thread may include a large number of instructions, for example, several tends instructions to several tends thousands instructions. A large number of the load instructions are subjected to the data dependence speculative execution.

The conventional data dependence detector 100 needs to store the addresses of all of the load instructions. If the free space of the address buffer 101 becomes disappear, the conventional data dependence detector 100 is no longer capable of performing the data dependence speculative execution, but capable of performing the sequential and definitive execution. The conventional data dependence detector 100 does not provide any sufficient effect of improving the high speed execution of the program by the data dependence speculative execution in the thread parallel processings. In order to obtain the sufficient effect of improving the high speed execution of the program, it is necessary to provide a large hardware size.

By contrast, the data dependence detector 30 of this embodiment allows the areas for the addresses of the load/store instructions, so that it is unnecessary to store the addresses of all of the load instructions. This results in that there is no limitation to the number of the load instructions which may be subjected to the data dependence speculative execution. The necessary hardware size is also small. Since the necessary time for detecting the read after write dependence is short, this makes it possible to improve the high speed and high frequency performances of the processor. The data dependence detector 30 selects the thread for the read after write dependence based on the thread sequence 40 supplied from the thread control unit 55. The data dependence detector 30 is capable of detecting correctly the read after write dependence in response with flexibility to the thread sequence.

The data dependence detector 30 refers the thread sequence 40 supplied from the thread control unit 55 and designates the processor executing the prior thread which is prior in program sequence to the thread executed by the self-processor. Only when the processor for the prior thread executes the load instruction, the read out operation from the instruction history table 32 is made, and subsequently the logical-OR operation is made by the logical-OR function 41 to realize the detection of the presence of the read after write dependence from the prior thread to the thread executed by the self-processor.

It is possible that if the other processor executes the store instruction, the read out operation is always made from the instruction history table 32 independent from the issue of whether it is prior to the self-processor. In this case, when the logical-OR function 41 performs the logical-OR operation, the data dependence detector 30 refers the thread sequence 40 supplied from the thread control unit 55 and designates the processor executing the prior thread which is prior in program sequence to the thread executed by the self-processor, so as to detect the presence of the read after write dependence from the prior thread to the thread executed by the self-processor.

For the data dependence speculative execution in the thread unit in the thread parallel processings, if the load instruction is executed by the self-processor, then the address of the load instruction is converted by the hash function circuit 31 into the entry number of the instruction history table 32, so that a value indicating that the load instruction has been executed is stored into the entry designated by the entry number. If the load instruction is executed by the other processor, then the address of the load instruction is converted by the hash function circuit 31 into the entry number of the instruction history table 32, so that a value indicating whether or not the load instruction has been executed is read out from the entry designated by the entry number. As a result, the possibility of the presence of the read after write dependence from the store instruction executed by the other processor to the load instruction executed by the self-instruction is detected. The above described structure may also be applicable to detect the possibility of a write after read dependence or the possibility of an write after write dependence.

For example, if the store instruction has been executed by the self-processor, the address of the store instruction is converted by the hash function circuit 31 into the entry number of the instruction history table 32. The value indicating that the store instruction has been executed by the self-processor is stored into the entry of the instruction history table 32, which is indicated by the entry number as converted. If the load instruction has been executed by the other processor, the address of the load instruction is converted by the hash function circuit 31 into the entry number of the instruction history table 32. The value indicating that the store instruction has been executed by the self-processor is read out from the entry of the instruction history table 32, which is indicated by the entry number as converted. As a result, the possibility of the presence of the write after read dependence from the load instruction executed by the other processor to the store instruction executed by the self-processor is detected by the data dependence detector.

For example, if the store instruction has been executed by the other processor, the address of the store instruction is converted by the hash function circuit 31 into the entry number of the instruction history table 32. The value indicating that the store instruction has been executed by the self-processor is read out from the entry of the instruction history table 32, which is indicated by the entry number as converted. In addition, if the store instruction has been executed by the self-processor, the address of the store instruction is converted by the hash function circuit 31 into the entry number of the instruction history table 32. The value indicating that the store instruction has been executed by the self-processor is stored into the entry of the instruction history table 12, which is indicated by the entry number as converted. As a result, the possibility of the presence of the write after write dependence from the store instruction executed by the other processor to the store instruction executed by the self-processor is detected by the data dependence detector.

For example, if the load instruction has been executed by the other processor, the address of the load instruction is converted by the hash function circuit 31 into the entry number of the instruction history table 32. The value indicating that the store instruction has been executed by the self-processor is read nut from the entry of the instruction history table 32, which is indicated by the entry number as converted. In addition, if the store instruction has been executed by the other processor, the address of the store address is converted by the hash function circuit 31 into the entry number of the instruction history table 32. The value indicating that the load instruction has been executed by the self-processor as well as the value indicating that the store instruction has been executed by the self-processor are read out from the entry of the instruction history table 32, which is indicated by the entry number as converted. If the load instruction has been executed by the self-processor, the address of the load instruction is converted by the hash function circuit 31 into the entry number of the instruction history table 32. The value indicating that the load instruction has been executed by the self-processor is stored into the entry of the instruction history table 32, which is indicated by the entry number as converted. In addition, if the store instruction has been executed by the self-processor, the address of the store instruction is converted by the hash function circuit 31 into the entry number of the instruction history table 32. The value indicating that the store instruction has been executed lay the self-processor is stored into the entry of the instruction history table 32, which is indicated by the entry number as converted. As a result, the possibility of the presence of the read after write dependence from the store instruction executed by the other processor to the load instruction executed by the self-processor, the possibility of the presence of the write after read dependence from the load instruction executed by the other processor to the store instruction executed by the self-processor and the possibility of the presence of the write after write dependence from the store instruction executed by the other processor to the store instruction executed by the self-processor are detected.

The data dependence detector 30 is capable of detecting the read after write dependence between the threads but incapable of detecting the read after write dependence between the instruction in the same thread. The data dependence detector 30 allows the data dependence speculative execution in the thread units in the thread parallel processings but does not allow the data dependence speculative execution in the instruction units in the thread.

The data dependence detector 30 provides the effect that the necessary hardware size for the data dependence speculative execution in the thread units in the thread parallel processings is small. The number of the load instructions which may be subjected to the data dependence speculative execution is not limited by the hardware size. A small hardware size may obtain the improvement of the high speed processing by the data dependence speculative execution in the thread units in the thread parallel processings. The necessary time for detecting the dependence between the threads is short. The high speed and high frequency performances of the processor may be improved.

Third Embodiment

Figure 7C:
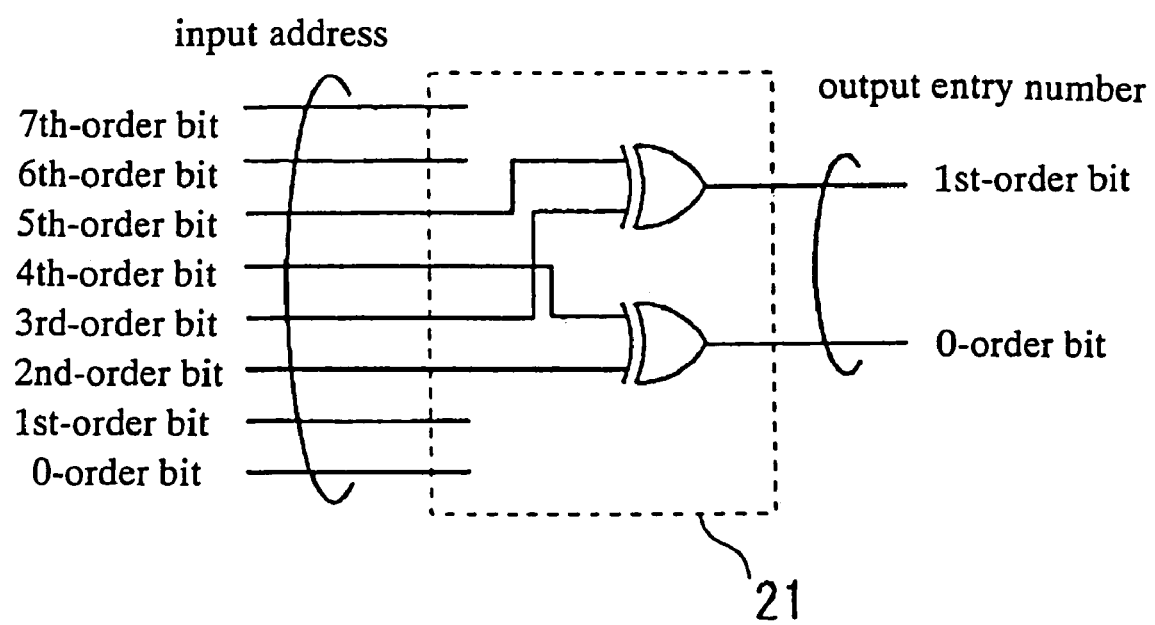
FIG. 7C is a diagram illustrative of a first example of the hash function circuit in the third embodiment in accordance with the present invention.
Figure 10:
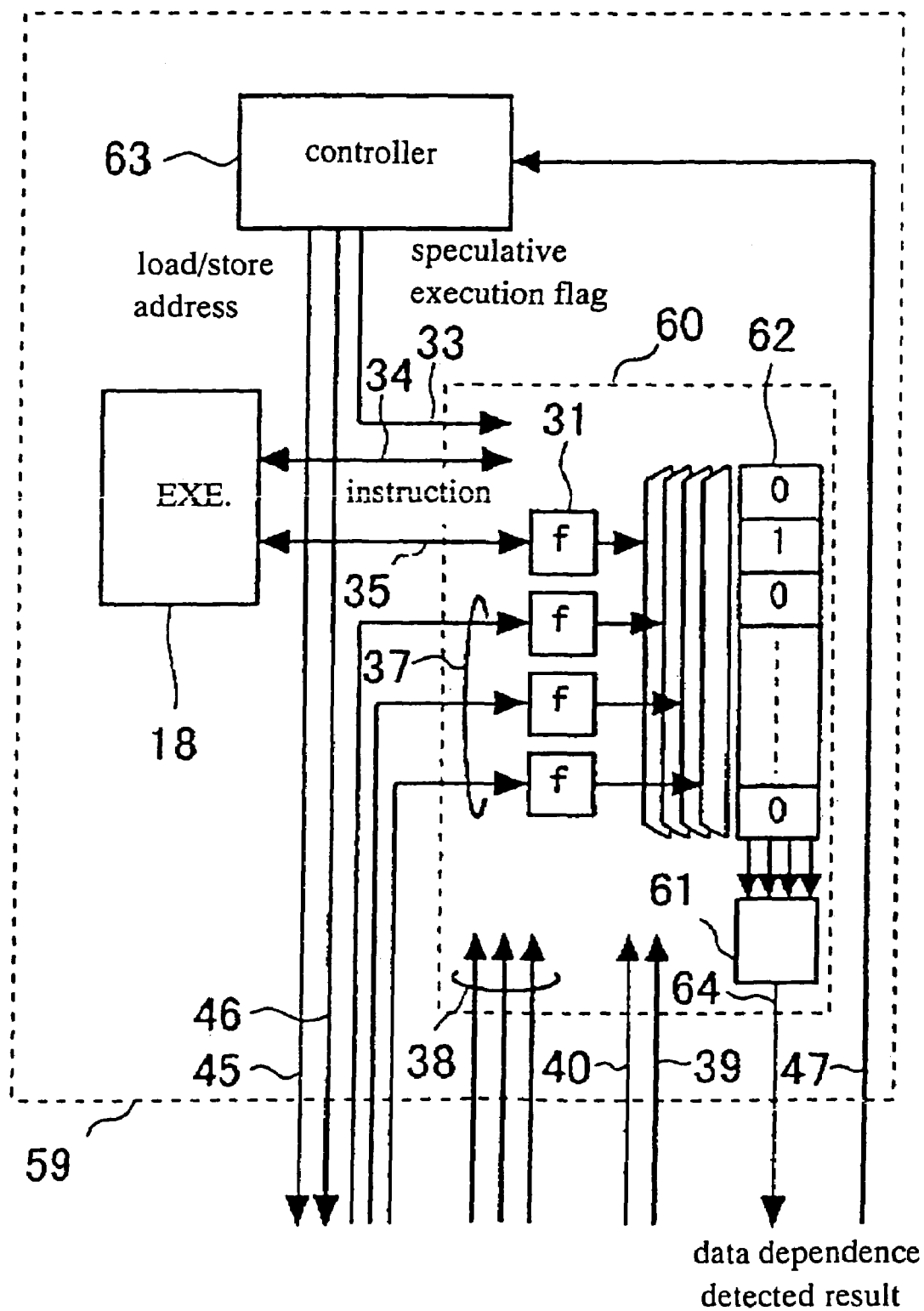
FIG. 10 is a diagram illustrative of a structure of a processor included in a multiple processor system in a third embodiment in accordance with the present invention.

A third embodiment according to the present invention will be described in detail with reference to the drawings. FIG. 10 is a diagram illustrative of a structure of a processor 59 included in a multiple processor system in a third embodiment in accordance with the present invention. FIG. 7C is a diagram illustrative of a first example of the hash function circuit in the third embodiment in accordance with the present invention. The system includes plural processors including the processor 59, and a thread control unit not illustrated. The processor 59 has almost the same internal structure as the processors 50, 51, 52 and 53 described in the above second embodiment.

If the thread allocated by the thread control unit is executed by the processor 59, a processor control unit 63 in the processor 59 supplies a data dependence detector 60 with a speculative execution flag 33 which indicates whether the instructions included in the thread should be executed definitively in accordance with the program sequence or executed speculatively independent from the program sequence. The processor control unit 63 supplies the kind of the instructions to be executed to the instruction execution unit 18 and the data dependence detector 60 as well as to the other three processors through the execution instructions 46. The data dependence detector 60 receives the input of the kind of the instruction to be executed from the execution instruction 34. The data dependence detector 60 also receives the inputs of the kinds of the instructions to be executed by the other three processors from the execution instructions 38. If the instruction to be executed is the load instruction or the store instruction, the processor control unit 63 supplies the address of the instruction to the instruction execution unit 18 and the data dependence detector 60 as well as to the other three processors through the load/store addresses 45. The data dependence detector 60 receives the input of the address of the load/store instruction front the load/store address 35. Concurrently, the instructions to be executed by the other three processors are the load or store instructions, then the data dependence detector 60 receives the input of the addresses of the load/store instructions from the load/store addresses 37.

The data dependence detector 60 includes four hash function circuits 31, an instruction history table 62 and a logical-OR circuit 61. The data dependence detector 60 receives inputs of the speculative execution flag 33, the execution instruction 34, and the load/store address 35 from the processor control unit 63 in the self-processor as well as receives inputs of the execution instructions 38, and the load/store addresses 37 from the other three processors. The data dependence, detector 60 also receives inputs of the speculative execution flag 39 and the thread sequence 40 from the thread control, unit. The data dependence detector 60 has a data dependence detected result 64 which is supplied to the thread control unit.

Each of the processors has four hash function circuits 31, each of which comprises a logic circuit realizing a hash function "f" which converts the address of the load instruction or the store instruction into the entry number of the instruction history table 62. The hash function "f" takes the same value for the same input. If N1=f(A1) and N2=f(A2), then A1=A2 cases N1=N2. One of the four hash function circuits 31 converts the address of the load or-store instruction to be executed by the self-processor into the entry number of the instruction history table 62. Each of the remaining three hash function circuits 31 converts the address of the store instruction to be executed by respective one of the other three processors into the entry number of the instruction history table 62.

The instruction history table 62 comprises a plurality of entry which stores one-bit information. If the output from the hash function circuit 31 has an n-bit width, then a total number of the entries is equal to then power of 2. The instruction history table 62 has a single write port and three read ports for performing a single write operation and three read operations concurrently. One of the four hash function circuits 31 has the input port of the address of the load instruction to be executed by the self-processor. This hash function circuit 31 has an output port which is connected to the write port of the instruction history table 32 for write operation to the entry designated by the entry number supplied from the hash function circuit 31. The remaining three hash function circuits 31 having the input ports of the addresses of the store instructions to be executed by the processors have an output port which is connected to the read port of the instruction history table 62. The instruction history table 62 is capable of initializing all of the entries upon receipt of the input of the speculative execution flag 39 from the thread control unit and from the speculative execution flag 33 supplied from the processor control unit 63 and inputted into the data dependence detector 60. A logic-OR function 41 operates a logic-OR of a single read/write port and three read ports of the instruction history table 62, and this operated result is supplied to the data dependence detected result 64 which is transmitted to the thread control unit.

Operations of the data dependence detector 60 will be described. In an initial state, all of the entries of the instruction history table 62 are in the first state, for example, logic "0" which indicates that the load instruction has not been executed by the self-processor. If the self-processor does not perform the speculative instruction execution to the data dependence between the threads and does perform the thread execution of the threads in the order defined by the program (hereinafter referred to as "definitive execution state", and further if the self-processor does not perform the speculative instruction execution to the data dependence between the instructions included in the thread and does perform the instruction execution in the order defined by the program, then the data dependence detector 60 does not perform any operation.

If the self-processor does perform the speculative instruction execution to the data dependence between the threads, then the data dependence detector 60 does perform a detecting process for a read after write dependence from the store instruction to the load instruction, wherein the store instruction is to be executed by the processor allocated with a prior thread which is prior in program sequence to the thread to be executed by the self-processor, whilst the load instruction is to be executed by the self-processor.

The speculative execution flag 39 supplied from the thread control unit and inputted into the data dependence detector 60 indicates whether the self-processor is in the definitive execution state or the speculative execution state. Whether the thread to be executed by the self-processor is prior in program sequence to the threads to be executed by the other three processors is judged by the thread sequence 40 which is supplied from the thread control unit and inputted into the data dependence detector 60. The kinds of the instructions on executions by the other three processors are judged by the execution instructions 38 supplied from the other three processors into the data dependence detector 60.

If the self-processor is in the speculative instruction execution state to the data dependence between instructions included in the thread, the data dependence detector 60 does perform a detecting process for a read after write dependence from the store instruction to the load instruction, wherein the store instruction has previously been executed by the self-processor, whilst the load instruction is to be executed by the self-processor. The speculative execution flag 33 supplied from the processor 63 and inputted into the data dependence detector 60 indicates whether the self-processor is in the definitive execution state or the speculative execution state for execution of the instructions included in the thread. The kinds of the instructions executed by the self-processor is judged by the execution instructions 34 supplied from the processor 63 into the data dependence detector 60.

If the self-processor is in the speculative execution state to the thread executions or the instruction executions in the thread, after the self-processor performs the speculative execution of the load instruction, then the data dependence detector 60 stores that the load instruction has been speculatively executed to the instruction history table 62. In more detail, the address of the load instruction is converted by the hash function circuit 31 into the entry number of the instruction history table 62 for input into the write port of the instruction history table 62. The instruction history table 62 converts a corresponding entry to the inputted entry number into a second state, for example, a logical value "1" which indicates that the load instruction has speculatively been executed.

If the self-processor is in the speculative execution state for execution of the threads and if the store instruction is executed by the processor which is allocated with the prior thread which is prior in program sequence to the thread to be executed by the self-processor, then the data dependence detector 60 read out the state from the corresponding entry of the instruction history table 62. In more detail, the address of the store instruction is converted by the hash function circuit 31 into the entry number of the instruction history table 62 for input into the corresponding one of the three input ports of the instruction history table 62. The instruction history table 62 reads out the content of the entry designated by the entry number inputted and supplies the content to the logic-OR circuit 61. If the self-processor is in the speculative execution state for execution of the instructions included in thread and if the store instruction is executed by the self-processor, then the data dependence detector 60 read out the state from the corresponding entry of the instruction history table 62. In more detail, the address of the store instruction is converted by the hash function circuit 31 into the entry number of the instruction history table 62 for input into the corresponding one of the input ports of the instruction history table 62. The instruction history table 62 reads out the content of the entry designated by the entry number inputted and supplies the content to the logic-OR circuit 61. The logic-OR circuit 61 operates the logic-OR of the outputs from the three red ports of the instruction history table 32 and supplies the operated result to the data dependence detected result 64 which is transmitted to the thread control unit.

In case that the threads are executed by the data dependence speculative execution, if the address of the store instruction as executed by either of the processors executing the prior thread which is prior in program sequence to the thread executed by the self-processor is either equal to the address of the load instruction subjected to the data dependence speculative execution by the self-processor or allocated to the same entry of the instruction history table 62 due to appearance of the areas, then the value indicating, that the load instruction subjected to the data dependence speculative execution is present, is read out from the instruction history table 62, the possibility of the presence of the read after write dependence between the threads is detected. In this case, the data dependence detector 60 supplies the value indicating the failure of the data dependence speculative execution, for example, logical "1" onto the data dependence detected result, 64 which is transmitted to the thread control unit.

In case that the instructions in the thread are executed by the data dependence speculative execution, if the address of the store instruction as executed by the processor is either equal to the address of the load instruction subjected to the data dependence speculative execution by the self-processor or allocated to the same entry of the instruction history table 62 due to appearance of the areas, then the value indicating, that the load instruction subjected to the data dependence speculative execution is present, is read out from the instruction history table 62, the possibility of the presence of the read after write dependence between the threads is detected. In this case, the data dependence detector 60 supplies the value indicating the failure of the data dependence speculative execution, for example, logical "1" onto the data dependence detected result 64 which is then transmitted to the thread control unit.

The thread control unit receives the notice of the failure of the data dependence speculative execution from either the processors including the processor 59, and the thread control unit sends a request for recovery process against the failure of the data dependence speculative execution to the processor which has supplied the above notice of the failure of the data dependence speculative execution as well as to the processors executing the thread post in program sequence to the thread executed by the processor which has supplied the above notice. The processors have received the request for the recovery process to the failure of the data dependence speculative execution, wherein the processor control unit 63 receives the notice of the request for the recovery process from the recovery execution request 47.

The reason why the request for the recovery process to the failure of the data dependence speculative execution is sent to not only the processor which has supplied the above notice of the failure of the data dependence speculative execution but also the processors executing the thread post in program sequence to the thread executed by the processor which has supplied the above notice due to not only the failure of the data dependence speculative execution in the thread units but also the failure of the data dependence speculative execution in the instruction units in the thread would be as follows. It is possible that the processor which has the failure of the data dependence speculative execution of the instructions in the thread has subjected the load instruction to the data dependence speculative execution in violation to the read after write dependence. It is possible that the executed result of the thread with the failure of the data dependence speculative execution which has been executed by the processor having the failure of the data dependence speculative execution is not correct. It is thus possible that the executed result of the thread post in program sequence to the thread with the failure of the data dependence speculative execution is also not correct. Consequently, it is, therefore, possible that the executed results of any threads, which are post in program sequence to the thread with the failure of the data dependence speculative execution would be not correct. For those reasons, the request for the recovery process to the failure of the data dependence speculative execution is sent to not only the processor which has supplied the above notice of the failure of the data dependence speculative execution but also the processors executing the thread post in program sequence to the thread executed by the processor which has supplied the above notice, in order to ensure the correctness of the executed result of the threads.

In the processor having received the request for the recovery process against the failure of the data dependence speculative execution of the thread unit or the instruction unit included in the thread, the processor control unit 63 is notified of the request for the recovery process against the failure of the data dependence speculative execution from the recovery process execution request 47. In this case, each of the processors performs the necessary recovery process to ensure the correctness of the executed result of the threads.

As described above, the data dependence detector 60 of this embodiment is capable of not only detecting the read after write dependence from the store instruction included in the prior thread, which is prior in program sequence to the thread executed by the self-processor, into the load instruction included in the thread executed by the self-processor but also detect the read after write dependence between instructions included in the thread executed by the self-processor, namely, the read after write dependence from the store instruction included in the thread executed by the self-processor to the load instruction included in the thread executed by the self-processor. The above two functions are realized by that the instruction history table 62 in the data dependence detector 60 has read/write ports for write operation in the data dependence speculative execution of the load instruction by the self-processor and also for the read operation in the data dependence speculative execution of the store instruction by the self-processor. In the thread parallel processings, the data dependence speculative execution in the thread units is realized for obtaining a high speed execution of the program by the parallel executions of the threads as well as for realizing the data dependence speculative execution in the instruction units in the thread, whereby the program execution independent from the program sequence at the high speed processings can be realized.

The data dependence detector 60 refers the thread sequence 40 supplied from the thread control unit and designates the other processor executing the prior thread which is prior in program sequence to the thread executed by the self-processor. Only when the other processor for the prior thread executes the store instruction, the read out operation from the instruction history table 62 is made, and subsequently the logical-OR operation is made by the logical-OR function 61 to realize the detection of the presence of the read after write dependence from the prior thread to the thread executed by the self-processor.

It is possible that if the other processor executes the store instruction, the read out operation is always made from the instruction history table 62 independent from the issue of whether it is prior to the self-processor. In this case, when the logical-OR function 61 performs the logical-OR operation, the data dependence detector 60 refers the thread sequence 40 supplied from the thread control unit and designates the processor executing the prior thread which is prior in program sequence to the thread executed by the self-processor, so as to detect the presence of the read after write dependence from the prior thread to the thread executed by the self-processor.

For the data dependence speculative execution in the thread unit in the thread parallel processings, if the load instruction is executed by the self-processor, then the address of the load instruction is converted by the hash function circuit 31 into the entry number of the instruction history table 62, so that a value indicating that the load instruction has been executed is stored into the entry designated by the entry number. If the store instruction is executed by the self-processor or the other processor, then the address of the store instruction is converted by the hash function circuit 31 into the entry number of the instruction history table 62, so that a value indicating whether or not the load instruction has been executed by the self-processor is read out from the entry designated by the entry number. As a result, the possibility of the presence of the read after write dependence from the store instruction executed by the self-processor or the other processor to the load instruction executed by the self-instruction is detected. The above described structure may also be applicable to detect the possibility of a write after read dependence or the possibility of an write after write dependence.

For example, if the store instruction has been executed by the self processor, the address of the store instruction is converted by the hash function circuit 31 into the entry number of the instruction history table 62. The value indicating that the store instruction has been executed by the self-processor is stored into the entry of the instruction history table 62, which is indicated by the entry number as converted. If the load instruction has been executed by the self-processor or the other processor, the address of the load instruction is converted by the hash function circuit 31 into the entry number of the instruction history table 62. The value indicating that the store instruction has been executed by the self-processor is read out from the entry of the instruction history table 62, which is indicated by the entry number as converted. As a result, the possibility of the presence of the write after read dependence from the load instruction executed by the self-processor or the other processor to the store instruction executed by the self-processor is detected by the data dependence detector 60.

For example, if the store instruction has been executed by the other processor, the address of the store instruction is converted by the hash function circuit 31 into the entry number of the instruction history table 62. The value indicating that the store instruction has been executed by the self-processor is read out from the entry of the instruction history table 32, which is indicated by the entry number as converted. In addition, if the store instruction has been executed by the self-processor, the address of the store instruction is converted by the hash function circuit 31 into the entry number of the instruction history table 62. The value indicating that the store instruction has been executed by the self-processor is read out from the entry of the instruction history table 12, which is indicated by the entry number as converted, and in addition, the value indicating that the store instruction has been executed by the self-processor is stored into the entry of the instruction history table 12, which is indicated by the entry number as converted. As a result, the possibility of the presence of the write after write dependence from the store instruction executed by the self-processor or the other processor to the store instruction executed by the self-processor is detected by the data dependence detector.

For example, if the load instruction has been executed by the self-processor or the other processor, the address of the load instruction is converted by the hash function circuit 31 into the entry number of the instruction history table 62. The value indicating that the store instruction has been executed by the self-processor is read out from the entry of the instruction history table 62, which is indicated by the entry number as converted. In addition, if the store instruction has been executed by the self-processor or the other processor, the address of the store address is converted by the hash function circuit 31 into the entry number of the instruction history table 62. The value indicating that the load instruction has been executed by the self-processor is read out from the entry of the instruction history table 62, which is indicated by the entry number as converted. If the load instruction has been executed by the self-processor, the address of the load instruction is converted by the hash function circuit 31 into the entry number of the instruction history table 62. The value indicating that the load instruction has been executed by the self-processor is stored into the entry of the instruction history table 62, which is indicated by the entry number as converted. In addition, if the store instruction has been executed by the self-processor, the address of the store instruction is converted by the hash function circuit 31 into the entry number of the instruction history table 62. The value indicating that the store instruction has been executed by the self-processor is stored into the entry of the instruction history table 62, which is indicated by the entry number as converted. As a result, the possibility of the presence of the read after write dependence from the store instruction executed by the self-processor or the other processor to the load instruction executed by the self-processor, the possibility of the presence of the write after read dependence from the load instruction executed by the self-processor or the other processor to the store instruction executed by the self-processor and the possibility of the presence of the write after write dependence from the store instruction executed by the self-processor or the other processor to the store instruction executed by the self-processor are detected.

The data dependence detector 30 is capable of detecting the read after write dependence between the threads but incapable of detecting the read after write dependence between the instruction in the same thread. The data dependence detector 30 allows the data dependence speculative execution in the thread units in the thread parallel processings but does not allow the data dependence speculative execution in the instruction units in the thread.

The data dependence detector 60 is capable of both the data dependence speculative execution in the thread units in the thread parallel processings and the data dependence speculative execution in the instruction units in the thread. The data dependence detector 60 provides the effect that the necessary hardware size for the data dependence speculative execution is small. The number of the load instructions which may be subjected to the data dependence speculative execution is not limited by the hardware size. A small hardware size may obtain the improvement of the high speed processing by both the data dependence speculative execution in the thread units in the thread parallel proceedings and the data dependence speculative execution in the instruction units in the thread. The necessary time for detecting the data dependence is short. The high speed and high frequency performances of the processor may be improved.

In accordance with the above-described present invention, the processor including the data dependence detector may be realized as a semiconductor integrated circuit (LSI) on a semiconductor substrate.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A multiple processor system for thread parallel processings, said system including:
   a plurality of processors which further includes an instruction execution unit; a processor control unit; and a data dependence detector; and
   a thread control unit being configured to allocate threads to said plurality of processors for allowing each of said plurality of processors to execute at least an allocated thread, and said thread control unit being also configured to supply each of said plurality of processors with both a respective speculative execution flag which indicate whether or not said thread should be executed by a data dependence speculative execution, and a thread sequence which indicates execution sequences of said threads, whereby each of said processors receives said speculative execution flag and said thread sequences and executes said at least allocated thread allocated by said thread control unit, wherein said processor control unit supplies a kind of an instruction to be executed by a self-processor, in which said processor control unit is provided, to said instruction execution unit and said data dependence detector which are provided in said self-processor, and as well as to at least an other processor than said self-processor, said data dependence detector receives said kind of said instruction to be executed by said self-processor, and also receives kinds of instructions to be executed by said other processor from processor control units provided in said other processor;

if said instruction to be executed is either a load instruction or a store instruction, said processor control unit supplies an address of said instruction to said instruction execution unit and said data dependence detector which are provided in said self-processor, and as well as to said other processor;

said data dependence detector includes the same number of address converters as a total number of said processors included in said system, an instruction history storing unit and a logic circuit;

said data dependence detector judges whether said self-processor is in a definitive execution state or a speculative execution state based on said speculative execution flag supplied from said thread control unit;

said data dependence detector judges, whether said thread executed by said self-processor is prior in program sequence to a respective thread executed by said other processor, based on said thread sequences, and said data dependence detector supplies a data dependence detected result to said thread control unit;

one of said address converters converts an address of a load instruction to be executed by said self-processor into an entry number of said instruction history storing unit, and remaining of said address converters converts an address of a store instruction to be executed by said other processor into an entry number of said instruction history storing unit;

said instruction history storing unit comprises a plurality of entries, a single write port and plural read ports which number is smaller by one than said total number of said processors;

said address converter, which has an input port for receiving said address of said instruction to be executed by said self-processor, has an output port connected to said write port of said instruction history storing unit for write operation into an entry designated by said entry number of said instruction history storing unit;

said address converter, which has an input port for receiving said address of said instruction to be executed by said other processor, has an output port connected to said read port of said instruction history storing unit for read operation from an entry designated by said entry number of said instruction history storing unit; and said logic circuit operates a logical-OR of said plural read ports of said address converter and supplies an operated logic value as a data dependence detected result to said thread control unit, and wherein said address converter is configured to convert same addresses of different load and store instructions into entry numbers that are the same and said address converter is configured to convert some different addresses of different load and store instructions into entry numbers that are the same, whereby if at least one kind of address dependence is not present, then said data dependence detector may detect a pseudo presence of said at least one kind of address dependence;

wherein if said self-processor is in said speculative execution state and said load instruction has speculatively been executed by said self-processor, then said address converter in said data dependence detector converts an address of said load instruction into an entry number of said instruction history storing unit and supplies said entry number to said write port of said instruction history storing unit, so that said instruction history storing unit sets a value indicating, that said load instruction has speculatively been executed, at an entry designated by said entry number, if said self-processor is in said speculative execution state and said store instruction has been executed by said other processor which is allocated with a prior thread which is prior in program sequence to a thread executed by said self-processor, then said address converter in said data dependence detector converts an address of said store instruction into an entry number of said instruction history storing unit and supplies said entry number to corresponding one of said input ports of said instruction history storing unit, so that said instruction history storing unit reads a content from an entry designated by said entry number and supplies said content to said logic circuit, said logic circuit operates a logical-OR of said plural read ports of said address converter and supplies an operated logic value as a data dependence detected result to said thread control unit.

2. A multiple processor system for thread parallel processings, said system including:

a plurality of processors which further includes an instruction execution unit; a processor control unit; and a data dependence detector; and a thread control unit being configured to allocate threads to said plurality of processors for allowing each of said plurality of processors to execute at least an allocated thread, and said thread control unit being also configured to supply each of said plurality of processors with both a respective speculative execution flag which indicate whether or not said thread should be executed by a data dependence speculative execution, and a thread sequence which indicates execution sequences of said threads, whereby each of said processors receives said speculative execution flag and said thread sequences and executes said at least allocated thread allocated by said thread control unit, wherein said processor control unit supplies a kind of an instruction to be executed by a self-processor, in which said processor control unit is provided, to said instruction execution unit and said data dependence detector which are provided in said self-processor, and as well as to at least an other processor than said self-processor, said data dependence detector receives said kind of said instruction to be executed by said self-processor, and also receives kinds of instructions to be executed by said other processor from processor control units provided in said other processor;

if said instruction to be executed is either a load instruction or a store instruction, said processor control unit supplies an address of said instruction to said instruction execution unit and said data dependence detector which are provided in said self-processor, and as well as to said other processor;

said data dependence detector includes the same number of address converters as a total number of said processors included in said system, an instruction history storing unit and a logic circuit;

said data dependence detector judges whether said self-processor is in a definitive execution state or a speculative execution state based on said speculative execution flag supplied from said thread control unit;

said data dependence detector judges, whether said thread executed by said self-processor is prior in program sequence to a respective thread executed by said other processor, based on said thread sequences, and said data dependence detector supplies a data dependence detected result to said thread control unit;

one of said address converters converts an address of a load instruction to be executed by said self-processor into an entry number of said instruction history storing unit, and remaining of said address converters converts an address of a store instruction to be executed by said other processor into an entry number of said instruction history storing unit;

said instruction history storing unit comprises a plurality of entries, a single write port and plural read ports which number is smaller by one than said total number of said processors;

said address converter, which has an input port for receiving said address of said instruction to be executed by said self-processor, has an output port connected to said write port of said instruction history storing unit for write operation into an entry designated by said entry number of said instruction history storing unit;

said address converter, which has an input port for receiving said address of said instruction to be executed by said other processor, has an output port connected to said read port of said instruction history storing unit for read operation from an entry designated by said entry number of said instruction history storing unit; and said logic circuit operates a logical-OR of said plural read ports of said address converter and supplies an operated logic value as a data dependence detected result to said thread control unit, and wherein said address converter is configured to convert same addresses of different load and store instructions into entry numbers that are the same and said address converter is configured to convert some different addresses of different load and store instructions into entry numbers that are the same, whereby if at least one kind of address dependence is not present, then said data dependence detector may detect a pseudo presence of said at least one kind of address dependence;

wherein if an address of said store instruction executed by said other processor allocated with a prior thread which is prior in program sequence to a thread executed by said self-processor is either equal to an address of a load instruction subjected to a data dependence speculative execution by said self-processor or allocated to the same entry of said instruction history storing unit due to appearance of areas, then a value indicating, that said load instruction subjected to the data dependence speculative execution is present, is read out from said instruction history storing unit, a possibility of presence of a read after write dependence is detected, and said data dependence detector supplies a value indicating failure of said data dependence speculative execution to said thread control unit, said thread control unit receives a notice of failure of said data dependence speculative execution from either one of said processors, and said thread control unit sends a request for recovery process against failure of said data dependence speculative execution to a processor which has supplied said notice of failure of said data dependence speculative execution as well as to a processor executing a thread which is post in program sequence to a thread executed by said processor which has supplied said notice, and said processor control unit of said processor receives said request for said recovery process to failure of said data dependence speculative execution.

3. A method in a processor, the method comprising:

setting a speculative execution flag to indicate that the processor is in a speculative execution state in a case where instructions of a program are to be executed out of program order by the processor;

storing, in a case where the processor executes a load instruction of the program and the speculative execution flag indicates that the processor is in the speculative execution state, information indicating load instruction execution in an entry of a table where the entry corresponds to a result of a hash function applied to an address specified in the load instruction;

determining, in a case where the processor is to execute a store instruction of the program and the speculative execution flag indicates that the processor is in the speculative execution state, whether information indicating load instruction execution has been stored in a particular entry of the table where the particular entry corresponds to a particular result of the hash function applied to a particular address specified in the store instruction; and executing a recovery process to recover from failed speculative execution in a case where it is determined that information indicating load instruction execution has been stored in the particular entry of the table.

4. The method of claim 3, further comprising:
initializing all entries in the table to an initial state when the speculative execution flag is set.

5. The method of claim 3, further comprising:
performing the hash function on the address specified in the load instruction to obtain said result.

6. The method of claim 5,
wherein said result has fewer bits than a number of bits of the address specified in the load instruction.

7. The method of claim 3, further comprising:
performing the hash function on the particular address specified in the store instruction to obtain said particular result.

8. The method of claim 3, further comprising:
setting the speculative execution flag to indicate that the processor is in a definitive execution state in a case where instructions of the program are to be executed in program order by the processor.

9. A processor, comprising:
a processor control unit configured to set a speculative execution flag to indicate that the processor is in a speculative execution state in a case where particular instructions of a program are to be executed out of program order by the processor, and configured to supply instructions; and a data dependence detector configured to receive the instructions supplied from the processor control unit;

said data dependence detector configured to store, in a case where a load instruction is received from the processor control unit and the speculative execution flag has been set by the processor control unit to indicate that the processor is in the speculative execution state, information indicating load instruction execution in an entry of a table where the entry corresponds to a result of a hash function applied to an address specified in the load instruction;

said data dependence detector configured to determine, in a case where a store instruction is received from the processor control unit and the speculative execution flag has been set by the processor control unit to indicate that the processor is in the speculative execution state, whether information indicating load instruction execution has been stored in a particular entry of the table where the particular entry corresponds to a particular result of the hash function applied to a particular address specified in the store instruction;

said data dependence detector configured to supply a data dependence detected result indicating failure of speculative execution in a case where it is determined by the data dependence detector that information indicating load instruction execution has been stored in the particular entry of the table; and said processor control unit configured to receive the data dependence detected result from the data dependence detector, and configured to execute a recovery process to recover from failed speculative execution in a case where the data dependence detected result indicates failure of speculative execution.

10. The processor of claim 9, said data dependence detector configured to initialize all entries in the table to an initial state in a case where the speculative execution flag is set.

11. The processor of claim 9, said data dependence detector comprising:

a hash function circuit configured to perform the hash function on the address specified in the load instruction to provide said result.

12. The processor of claim 11, said hash function circuit configured such that said result has fewer bits than a number of bits of the address specified in the load instruction.

13. The processor of claim 9, said data dependence detector comprising:

a hash function circuit configured to perform the hash function on the particular address specified in the store instruction to provide said particular result.

14. The processor of claim 9, said processor control unit configured to set the speculative execution flag to indicate that the processor is in a definitive execution state in a case where a plurality of instructions of the program are to be executed in program order by the processor.

15. A method in a multiple processor system, the multiple processor system including a first processor and a second processor, the method comprising:

setting a speculative execution flag to indicate that the multiple processor system is in a speculative execution state in a case where threads of a program are executed in parallel by the first processor and the second processor;

storing, by the first processor in a case where the first processor executes a load instruction of a thread of the program and the speculative execution flag indicates that the multiple processor system is in the speculative execution state, information indicating load instruction execution in an entry of a table where the entry corresponds to a result of a hash function applied to an address specified in the load instruction;

determining, by the first processor in a case where the speculative execution flag indicates that the multiple processor system is in the speculative execution state and where the second processor is to execute a store instruction of another thread of the program that is prior in program sequence to the thread, whether information indicating load instruction execution has been stored in a particular entry of the table where the particular entry corresponds to a particular result of the hash function applied to a particular address specified in the store instruction; and executing, by the first processor, a recovery process to recover from failed speculative execution in a case where it is determined that information indicating load instruction execution has been stored in the particular entry of the table.

16. The method of claim 15, further comprising:

initializing all entries in the table to an initial state in a case where the speculative execution flag is set.

17. The method of claim 15, further comprising:

performing, by the first processor, the hash function on the address specified in the load instruction to obtain the result.

18. The method of claim 15, further comprising:

setting the speculative execution flag to indicate that the multiple processor system is in a definitive execution state in a case where particular threads of the program are executed in program sequence by the multiple processor system.

19. A multiple processor system, comprising:

a first processor;

a second processor; and a thread control unit configured to set a speculative execution flag to indicate that the multiple processor system is in a speculative execution state in a case where threads of a program are executed in parallel by the first processor and the second processor, and configured to provide the speculative execution flag to the first processor;

said first processor configured to store, in a case where the first processor executes a load instruction of a thread of the program and the speculative execution flag has been set by the thread control unit to indicate that the multiple processor system is in the speculative execution state, information indicating load instruction execution in an entry of a table where the entry corresponds to a result of a hash function applied to an address specified in the load instruction;

said first processor configured to determine, in a case where the speculative execution flag has been set by the thread control unit to indicate that the multiple processor system is in the speculative execution state and where the second processor is to execute a store instruction of another thread of the program that is prior in program sequence to the thread, whether information indicating load instruction execution has been stored in a particular entry of the table where the particular entry corresponds to a particular result of the hash function applied to a particular address specified in the store instruction; and said first processor configured to execute a recovery process to recover from failed speculative execution in a case where it is determined that information indicating load instruction execution has been stored in the particular entry of the table.

20. The multiple processor system of claim 19, said first processor configured to initialize all entries in the table to an initial value in a case where the speculative execution flag is set.

21. The multiple processor system of claim 19, said first processor configured to perform the hash function on the address specified in the load instruction to obtain said result.

22. The multiple processor system of claim 19, said thread control unit configured to set the speculative execution flag to indicate that the multiple processor system is in a definitive execution state in a case where particular threads of the program are executed in program sequence by the multiple processor system.

* * * * *